(12) United States Patent
Penumaka et al.

(10) Patent No.: US 10,102,535 B2
(45) Date of Patent: *Oct. 16, 2018

(54) SYSTEM AND METHOD FOR BRAND MANAGEMENT USING SOCIAL NETWORKS

(71) Applicant: ReadyPulse, Inc., San Carlos, CA (US)

(72) Inventors: Srinivas Penumaka, Redmond, WA (US); Dennis O'Malley, San Carlos, CA (US); Tankala Vinod K Gupta, Redmond, WA (US); Mihir A. Vaidya, Redmond, WA (US)

(73) Assignee: READY PULSE, INC., Sammamish, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/660,631

(22) Filed: Jul. 26, 2017

(65) Prior Publication Data
US 2017/0323312 A1 Nov. 9, 2017

Related U.S. Application Data

(63) Continuation of application No. 14/568,088, filed on Dec. 11, 2014, now Pat. No. 9,747,609, which is a (Continued)

(51) Int. Cl.
*G06F 15/16* (2006.01)
*G06Q 30/02* (2012.01)
(Continued)

(52) U.S. Cl.
CPC ... *G06Q 30/0201* (2013.01); *G06F 17/30864* (2013.01); *G06Q 50/01* (2013.01)

(58) Field of Classification Search
USPC ........ 709/204, 217, 223, 224; 707/628, 740; 715/751, 753
See application file for complete search history.

(56) References Cited

U.S. PATENT DOCUMENTS 7,698,398 B1 * 4/2010 Lai ............................ G06F 8/10
709/223
7,831,693 B2 11/2010 Lai
(Continued)

OTHER PUBLICATIONS

Experticity, Measure Each Experts Expertise, Jun. 9, 2012, https://web.archive.org/web/20120609115531/http://www.experticity.com/expert-score.

(Continued)

*Primary Examiner* — Tammy Nguyen
(74) *Attorney, Agent, or Firm* — Workman Nydegger

(57) ABSTRACT

A system for brand management using social networks comprising an application server, social network crawler software modules, third party service integration software modules, an analytics server, a report generator, a search engine, a behavioral analysis engine, a recommendation engine, and a database. A user registers and provides data pertaining to a brand. Upon retrieving content from a plurality of social networks pertaining to the brand, the analytics server module analyzes the content to a content value specific to the brand among members of the social networks. The behavioral analysis engine obtains content elements generated by a first member a social network and analyzes the first member's behavior to compute an audience value of the first member. The report generator prepares reports specific to the brand, the reports comprising at least indicia of content value, indicia of audience value, and recommendations for improving member engagement with the brand.

20 Claims, 17 Drawing Sheets

Related U.S. Application Data continuation-in-part of application No. 14/294,074, filed on Jun. 2, 2014, which is a continuation of application No. 13/555,063, filed on Jul. 20, 2012, now Pat. No. 8,745,217.

(60) Provisional application No. 61/509,918, filed on Jul. 20, 2011.

(51) Int. Cl.
*G06Q 50/00* (2012.01)
*G06F 17/30* (2006.01)

(56) References Cited

U.S. PATENT DOCUMENTS

| | | | | |
|---|---|---|---|---|
| 7,974,983 | B2* | 7/2011 | Goeldi | G06Q 10/00 |
| | | | | 707/628 |
| 8,069,435 | B1 | 11/2011 | Lai | |
| 8,346,929 | B1 | 1/2013 | Lai | |
| 8,447,852 | B1* | 5/2013 | Penumaka | G06Q 50/01 |
| | | | | 709/217 |
| 8,745,217 | B2 | 6/2014 | Penumaka | |
| 9,747,609 | B2 | 8/2017 | Penumaka | |
| 2005/0165645 | A1 | 7/2005 | Kirwin | |
| 2005/0209909 | A1* | 9/2005 | Dull | G06Q 10/06375 |
| | | | | 705/7.32 |
| 2006/0090073 | A1 | 4/2006 | Steinberg | |
| 2006/0161553 | A1* | 7/2006 | Woo | G06F 17/30684 |
| 2006/0240396 | A1 | 10/2006 | Foo | |
| 2007/0198510 | A1 | 8/2007 | Ebanks | |
| 2009/0012833 | A1 | 1/2009 | Kuhike | |
| 2010/0312769 | A1* | 12/2010 | Bailey | G06F 17/30705 |
| | | | | 707/740 |
| 2011/0119277 | A1 | 5/2011 | Sotos | |
| 2011/0191417 | A1* | 8/2011 | Rathod | G06Q 30/02 |
| | | | | 709/204 |
| 2011/0258560 | A1* | 10/2011 | Mercuri | G06F 17/3089 |
| | | | | 715/753 |
| 2011/0313987 | A1 | 12/2011 | Ghosh | |
| 2012/0015779 | A1 | 1/2012 | Powch | |
| 2012/0069131 | A1 | 3/2012 | Abelow | |
| 2012/0158476 | A1* | 6/2012 | Neystadt | G06Q 30/0214 |
| | | | | 705/14.16 |
| 2012/0159635 | A1 | 6/2012 | He | |
| 2012/0226748 | A1 | 9/2012 | Bosworth | |
| 2012/0272164 | A1 | 10/2012 | Polonsky | |
| 2013/0124268 | A1* | 5/2013 | Hatton | G06Q 10/063112 |
| | | | | 705/7.38 |
| 2013/0159507 | A1* | 6/2013 | Mason | G06Q 30/02 |
| | | | | 709/224 |
| 2013/0346171 | A1* | 12/2013 | Wright | G06Q 30/0214 |
| | | | | 705/14.16 |
| 2014/0059447 | A1* | 2/2014 | Berk | G06Q 10/10 |
| | | | | 715/751 |
| 2014/0207518 | A1 | 7/2014 | Kannan | |
| 2014/0207609 | A1 | 7/2014 | Earhart | |
| 2014/0229293 | A1 | 8/2014 | Huang | |
| 2014/0342833 | A1 | 11/2014 | Robbins | |
| 2016/0104178 | A1 | 4/2016 | Stockham | |

OTHER PUBLICATIONS

Experticity, Make the Smartest Purchase Possible With Expert Advice, Jun. 27, 2012, http://web.archive.org/web/20120627131118/http://www.experticity.com/consumers.
U.S. Appl. No. 13/629,596, dated Dec. 3, 2012, Notice of Allowance.
U.S. Appl. No. 13/555,063, dated Nov. 27, 2013, Office Action.
U.S. Appl. No. 13/555,063, dated Mar. 24, 2014, Notice of Allowance.
U.S. Appl. No. 14/568,088, dated Jan. 12, 2017, Notice of Allowance.
U.S. Appl. No. 14/568,088, dated Apr. 27, 2017, Notice of Allowance.
U.S. Appl. No. 14/514,229, dated Oct. 31, 2017, Office Action.
U.S. Appl. No. 14/514,229, dated Jun. 30, 2017, Final Office Action.
U.S. Appl. No. 14/514,229, dated Jan. 12, 2017, Office Action.
U.S. Appl. No. 14/514,229, dated Aug. 16, 2018, Final Office Action.

* cited by examiner

SYSTEM AND METHOD FOR BRAND MANAGEMENT USING SOCIAL NETWORKS

CROSS-REFERENCE TO RELATED APPLICATIONS

This application is a continuation of U.S. patent application Ser. No. 14/568,088, entitled "SYSTEM AND METHOD FOR BRAND MANAGEMENT USING SOCIAL NETWORKS" and filed Dec. 11, 2014, which is a continuation-in-part of U.S. patent application Ser. No. 14/294,074, entitled "SYSTEM AND METHOD FOR BRAND MANAGEMENT USING SOCIAL NETWORKS" and filed on Jun. 2, 2014, which is a continuation of U.S. patent application Ser. No. 13/555,063, entitled "SYSTEM AND METHOD FOR BRAND MANAGEMENT USING SOCIAL NETWORKS", which was filed on Jul. 20, 2012, now issued as U.S. Pat. No. 8,745,217 on Jun. 3, 2014, which claims priority to U.S. provisional patent application Ser. No. 61/509,918, entitled "SYSTEM AND METHOD FOR BRAND MANAGEMENT USING SOCIAL NETWORKS," which was filed on Jul. 20, 2011, each of which are hereby incorporated by reference in their entirety.

BACKGROUND OF THE INVENTION

Field of the Invention

The present invention is in the field of brand management software solutions, and more particularly in the field of using data pertaining to social media to identify recommended actions for optimally managing a brand.

Discussion of the State of the Art

Social networks have become one of the dominant forms of consumer interaction with the Internet in the last few years. Accordingly, numerous innovations have been made by various players to add advertising capabilities and to otherwise aid in the monetization of social network traffic. As these social networks have become so dominant, enterprises—particularly those with strong consumer brands have moved more or less vigorously to adopt social networks for corporate use. It is commonplace today, for example, for consumer brands (and some business-to-business brands as well) to monitor social networks closely (particularly FACEBOOK™ and TWITTER™) in order to gauge how their customers perceive the brands and the products associated with them. Moreover, many companies today are attempting to engage in meaningful "conversations" with consumers, both customers and prospective customers, using social media, for example by responding to complaints made in social media (that is, content associated with social networks), or by identifying community influencers and attempting to market to those individuals to reinforce a company's brand.

Several challenges are emerging as these trends take place. Because there are several social networks that are relevant to any given brand, each with its own usage paradigm, it is difficult for brand managers to collate content from various social networks and make sense of it as an overall picture of what a particular brand's perception among consumers is. It may also be difficult to identify which content to use for brand marketing purposes.

SUMMARY OF THE INVENTION

The inventor has developed a system and method for providing automated recommendations to users for brand management using social media, the recommendations being driven by data collected from social media systems and analyzed according to various embodiments of the invention. The invention comprises a data collection system which gathers data from a plurality of social media networks and ancillary sources, a data analysis system which analyzes the collected data to assess brand performance of target brands, a user interface that allows brand managers and other users to establish goals, monitor brand presence in social media, review and adopt recommendations intended to achieve the established goals, and measure progress in actual goal achievement, and an optimization software module coupled to the data analysis system that uses analysis results to determine an optimum set of recommendations for each user to achieve the user's identified goals, taking particularly into account previous results in response to previous goals and actions taken to achieve those goals. Moreover, in some embodiments the invention provides content curation, moderation and approval processes, and scoring to recommend which content to use and which audience to invite as brand advocates.

According to a preferred embodiment of the invention, a system for brand management using social networks is disclosed. The embodiment comprises an application server, a plurality of social network crawler software modules, a plurality of third party service integration software modules, an analytics server, a report generator, a search engine, a behavioral analysis engine, a recommendation engine, and a database. A user registers and provides data pertaining to a brand. Upon retrieving content from a plurality of social networks pertaining to the brand, the analytics server module analyzes the content to a content value specific to the brand among members of the social networks. The behavioral analysis engine obtains content elements generated by a first member a social network and analyzes the first member's behavior to compute an audience value of the first member. The report generator prepares reports specific to the brand, the reports comprising at least indicia of content value, indicia of audience value, and recommendations for improving member engagement with the brand.

According to various embodiments of the invention, various systems and methods provide multi-social, multi-channel stream integration (meaning streams of updates from multiple social networks, received via multiple channels, may be integrated into one or more single feed/update streams, which may in turn be provided to users in various ways. such as via use of widgets in web pages, via mobile applications, and the like). Various embodiments may provide a common scoring system for user generated content, providing an ability to have a common engagement and influence score for user generated content from multiple social networks and multiple channels, utilizing behavioral analysis of content creators and analysis of audience engagement with specific content. According to various embodiments, identification and personalization of user generated testimonials may be provided, giving users an ability to determine positive testimonial/endorsement through analysis of content creators, content types, and content engagement by audiences. The invention may provide an ability to surface a personalized set of testimonials based on identifying information such as web visitor cookies or social network login data, mapping many attributes from the testimonial. Moreover, various embodiments may provide for indexing of testimonials, providing an ability to track, measure, and score testimonials using many attributes such as user feedback, user tagging, user and content segmentation, and the like. Various embodiments of the invention may provide integration into enterprise and e-commerce systems, giving users an ability to integrate social media with enterprise and e-commerce systems. This may for example enable posting of testimonials with direct tagging to connect testimonials to product catalog information. Users may be provided with an ability to curate, publish, and measure testimonials based on product catalog information. Various embodiments may provide an enhanced testimonial process, whereby the system may generate, score, index, publish, and measure user generated testimonials from multiple channels and multiple social networks, thus providing a closed loop process for brand management.

According to an embodiment of the invention, the system gathers data from a plurality of social media networks. Data is collected on behalf of users (both individual and enterprise users), and the data collection system of the invention gathers data using a variety of approaches. In one approach, data pertaining to identified competitors of a given user is obtained as well as data regarding the user or the user's organization, in order to establish overall sentiment levels among consumers toward the competitors' brands, to monitor trends in those levels, and to compare the competitors' social marketing effectiveness against that of the user or the user's organization. Competitors may be identified explicitly by users, or may be identified implicitly by the system, for instance by using search terms normally associated with the user's business within a search engine, and then parsing the search results to identify other participants in the user's market, and then monitoring social media networks for mentions of the potential competitors. In some embodiments, information found pertaining to a potential competitor is compared to information provided either explicitly by the user or obtainable from the user's public website in order to determine how closely related the potential competitor's business is to the user's business. Users may be asked to confirm implicit competitor selection, and in some embodiments an iterative process of management of a competitor list is undertaken, with potential competitors added as required, and with non-competitors removed from the list either automatically or by user intervention.

Another source of data is general industry insights made available by journalists, bloggers, analysts, and the like. And finally of course information is proactively gathered from a wide range of social media networks. Such information may be gathered entirely automatically, for instance in an embodiment of the invention by a set of search queries generated by semantic analysis of the user's website and optionally a corpus of marketing documents provided by the user, and then parsing a large number of web pages identified in the search results in order to identify both competitors (as discussed above) and industry commentators. In addition, data is gathered not only specifically about a user and his company, his competitors, and his general industry, but also more broadly about how consumers tend to behave generally on various social media networks in various situations. According to the invention, as more data pertaining to consumer behaviors is obtained, the system will be able to better contextualize new behaviors and thereby to classify user's sentiments and actions in terms of acceptance (or not) of a given brand and its core promises or messages.

An important aspect of the present invention is the establishment by a user of goals pertaining to brand or product management. For instance, goals might include "achieve greater reach on Twitter", or "counter negative press about a particular situation using social media", or "improve consumer brand engagement". These goals are generally established by a user in a web-based user interface, although mobile user interfaces are also contemplated by the inventor (and of course users may in some cases still prefer to use so-called "thick" or "rich" clients accessing the services of the invention via web services or any other web-based programming interface method known in the art). According to the invention, each goal is associated with a plurality of metrics which, either directly or indirectly, are suitable for measuring a user's company's or brand's progress in achieving the goal. For instance, if a goal is "achieve greater reach on Twitter", then obviously a key metric will be the number of followers on TWITTER™ that the user's brand or company (or even the user herself) has. Less obvious metrics in this situation might include, for example, a rate of growth of the number of TWITTER™ followers, or a weighted follower count, wherein weights for a given network member are established based on the member's social connectivity and likelihood of a given member's retransmitting or commenting content provided by the user's company (or the user herself).

Metrics used to measure progress toward goals are measured with respect to a user's company or brand, but also with respect to the user's competitors and to the general industry and industry segments to which the user's brand or company belongs. In this way a key benefit of the invention, the comparison of a user's brand performance (either at a specific time or dynamically as a function of time) to that of competitors and applicable industries and industry segments is made possible by preferred embodiments of the invention. Such comparisons greatly assist users in understanding where there are areas for improvement, and where things are going well. Metrics are generally made available to the user via a web interface that supports a variety of well-established reporting methods known in the art, including "drill down" to allow a user to access more detailed information in order to investigate the causes for an observed phenomenon (for example, when progress against a metric is not meeting expectations despite the user's having carried out several recommendations). In addition, direct and derived metrics are used by the system of the invention to analyze effectiveness of actions taken, and to learn from the analysis what types of actions (whether recommended by the system or undertaken on a user's initiative directly) lead to what types of measurable results. These correlations (actions to metrics changes) may vary from industry to industry, from company or brand to company or brand, and even between social media networks (for example, user behaviors on LinkedIn are generally quite different from those on Facebook, because users tend to use the two social media networks for quite different purposes).

According to the invention, once a user has provided a set of goals, and once a body of metrics is in place to assess where the user's organization stands with respect to those goals, an optimization software module of the invention determines, via one of several algorithmic approaches, a plurality of recommendations to be made by the system to the user. Recommendations are determined based on what is most likely to move a user's key metrics closer to one or more goal states (sets of metric values that reflect satisfactory achievement of at least one of the user-defined goals). In some cases, correlations between possible actions and goal-based metrics, as in the case of "grow my reach on Twitter™ by getting me to 5000 followers by September 1st" to measure progress toward the goal, one merely needs to compute a current follower count, a recent follower count, and one can readily compute a rate of growth of follower count to determine if the goal is likely to be met. Of course, when there is more data available (in this case, many daily or weekly follower counts), then more refined prediction techniques (many of which are well-known in the art) may be used. In other cases, however, correctly identifying actions that, if taken, will tend to move a client closer to achieving a goal, can be quite challenging in less straight-forward situations. For example, it may not be clear at all what actions will positively affect the goal of "improving brand engagement". In such cases, a combination of heuristics may be created by humans (either the user or a member of staff of an organization providing services according to the invention to a plurality of users) or by automated means (for example, use of neural networks to determine "best fit" recommendation sets for a given type of goal. To facilitate use of automated recommendation generation, in some embodiments a number of predefined goals with configurable parameters are established by the system operator to facilitate at once both the establishment of goals by users or clients and maintaining a high proportion of use of pre-established goals for which well-defined recommendation sets have been developed in advance. As examples of recommendations that may be generated by the system according to the invention, users may receive recommendations from the system of any of the following types: recommended content actions (such as posting at least one blog post on product advantages per week; in some embodiments provides an example of a piece of content, such as for example text, one or more links, a video, or a photo), actions to be taken (such as establishing a Facebook™ fan page for the user's organization), best practices based on industry exemplars (such as adopting an industry standard set of privacy terms to encourage user adoption and trust; in most embodiments, systems according to the invention will maintain libraries of best practices by industry and by subject, and will recommend one or more of these when appropriate to assist in achieving one or more related goals), expert consultation (such as that a user should consider retaining a search engine optimization consultant to review ways to improve a blog's search engine performance; in preferred embodiments, maintains a network of experts and recommends particular experts to users for specific situations, and in many cases acts as a middleman or broker between producers and consumers of expert services related to social media brand management), campaigns (for instance, recommending that a user's organization establish a loyalty program adoption campaign using its Facebook™ fan page; in some embodiments will detect campaigns being conducted by identified competitors and will recommend related campaigns to the user to counter the effects of the competitor's campaign), and conversion applications (for example, improving the user experience from landing page to customer conversion; in a preferred embodiment provides access to its system to third-party solution providers to allow them to offer their solutions to users, in which case the system may recommend that certain of such third-party conversion applications are used in a given situation). Additional exemplary actions recommended according to a preferred embodiment of the invention comprise:

a. Follow—follow one or more people suggested by
b. Unfollow—unfollow one or more suggested people. The list of Twitter™ handles to unfollow will be based on the behavior exhibited by the Twitter™ users, such as unfollowing you after you followed them and/or spamming (tweeting more than certain times per hour, tweeting topics not relevant to your interests)
c. Engage—engage through direct message or @message with one or more suggested people. In Facebook, will send a Facebook™ message to the recipient. Suggest influencers based on the required frequency to keep the relationships
d. Tweet—tweet on influencer's content (tweets, blog posts, etc.) will suggest influencers based on the value of the influencer to its ecosystem and/or the focus area.
e. Retweet—retweet on influencer's suggested tweets.
f. Promote to Leader—promote one or more influencers to leader board
g. Increase tweets/Increase posts—increase frequency of tweets and posts to match or beat competition/industry
h. Avoid spammers—will identify potential spammers and will suppress their tweets/posts
i. Change tweet/post timings—will suggest when to tweet based on when a brand's audience is most active. This is determined based on the actual behavior of the audience
j. Conversation topics—will identify the potential topics of interest to the audience
k. Automatic @Reply
l. Automatic Direct Message after follow—will enable sending an automatic direct message after a Twitter™" user follows
m. Increase post/tweet frequency Examples of third-party conversion applications that might be recommended, according to the invention, comprise a social game that engages fans and promotes virality, a newsletter sign-up application, or a coupon distribution application.

According to a preferred embodiment of the invention, end user behaviors (that is, behavior of users of social media such as Twitter, Facebook, LinkedIn, and the like) are used advantageously to help determine recommendations to make to client users (that is, business users who are clients of a service delivered according to the invention). For example, as mentioned above, if certain Twitter™ end users are characterized by the fact that they tend to routinely follow back when followed, while others may not do so, then a recommendation based on a goal of "achieve greater reach by gaining more followers" might be to follow a certain number of the former end users (those who generally follow back), and following of those in the second group (who tend not to follow back) would be ignored. Similarly, content recommendations might be made based on a result of analysis that showed, for example, that certain highly-linked individuals (that is, certain influencers) tend to retransmit (retweet) messages pertaining to certain topics relevant to a business, but not to retransmit messages pertaining to other equally relevant topics. In such a situation, it would generally be desirable to generate content recommendations that suggest posting content relating to the first group of topics rather than the second group, in order to maximize a probability that influential readers, upon seeing the newly-created content, would retransmit at least some of the content and thus create "buzz" around messages of relevance to a client business.

When recommendations are generated by the system, in accordance with preferred embodiments of the invention, users may elect to adopt, decline, or defer each recommendation. Default settings may be used, and configured by each user or organization, so that inactivity is interpreted either as adoption, rejection, or deferral, as desired. According to some embodiments of the invention, recommendation adoption decisions are tracked by user, organization, time, and recommendation type, and the results are analyzed to determine if there are issues with a given class 10 of recommendations (and whether the issues are systemic or whether they affect only a small number of users or organizations). Clearly it will be seen that such analysis is one means for refining recommendation generation, as users will be less likely to receive recommendations they do not find useful or relevant after the system has had the opportunity to track the user's response to a large number of previous recommendations of varying types.

According to some embodiments, some accepted recommendations are implemented (fulfilled) automatically. For example, if a recommendation is to follow a list of known influencers on Twitter, and a user to whom the recommendation is made accepts the recommendation, then the system according to the invention will automatically execute the appropriate commands using, for example using the Twitter™ application programming interface (API). In some embodiments a scheduler is used, either automatically or under user control or based on user configuration, to ensure that an automated action is taken at specific times or at specific rates (for example, it may be desirable to have automatically-generated tweets delivered at a steady rate to avoid overloading Twitter™ or violating API access rules). In other cases, user action is required to implement a recommendation, as for example when the system recommends that a user increase her frequency of tweeting (posting items on Twitter); in these cases the system may analyze actions taken and raise alerts if users do not take actions based on one or more recommendations that they explicitly accepted. In some cases the system provides scheduling functions directly to users, as for example when according to some embodiments a user is allowed to bulk upload a large number of posts and to schedule them to be posted on her behalf at specified times or at a specified rate.

According to a preferred embodiment of the invention, a system for brand management using social networks comprising an application server, social network crawler software modules, third party service integration software modules, an analytics server, a report generator, a search engine, a behavioral analysis engine, a recommendation engine, and a database, is disclosed. A user registers and provides data pertaining to a brand. Upon retrieving content from a plurality of social networks pertaining to the brand, the analytics server module analyzes the content to a content value specific to the brand among members of the social networks. The behavioral analysis engine obtains content elements generated by a first member a social network and analyzes the first member's behavior to compute an audience value of the first member. The report generator prepares reports specific to the brand, the reports comprising at least indicia of content value, indicia of audience value, and recommendations for improving member engagement with the brand.

Because in preferred embodiments actions based on recommendations are tracked by the analysis system, and because progress toward achieving user-adopted goals is similarly tracked, the system normally provides web-based user interfaces that allow a user to assess progress toward meeting goals, and in implementing specific recommendations, in order to allow users to fine-tune their activities and possibly to request additional action recommendations to better meet projected targets.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
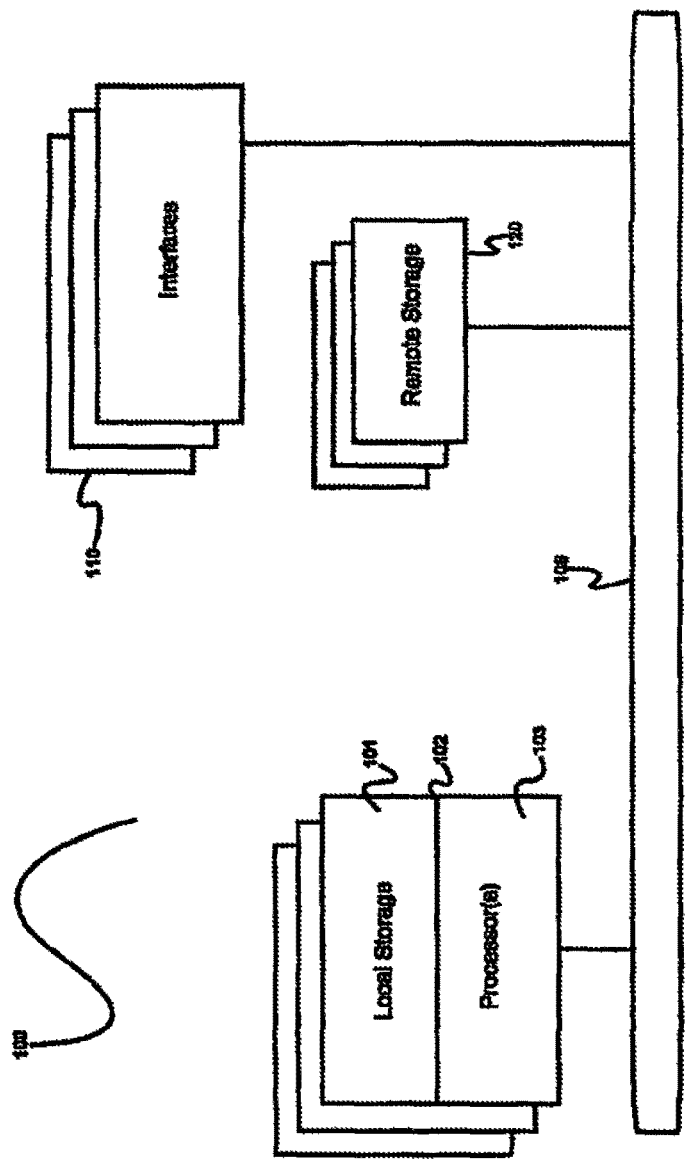
FIG. 1 is a block diagram illustrating a hardware architecture of a computing device used in various embodiments of the invention.

One or more different inventions may be described in the present application. Further, for one or more of the inventions described herein, numerous alternative embodiments may be described: it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

Similarly, preferred embodiments of the invention are described in terms of a web-based implementation, including components such as web servers and web application servers. However, such components are merely exemplary of a means for providing services over a large-scale public data network such as the Internet, and other implementation choices may be made without departing from the scope of the invention. For instance, while embodiments described herein deliver their services using web services accessed via one or more webs servers that in turn interact with one or more applications hosted on application servers, other approaches such as peer-to-peer networking, direct client-server integration using the Internet as a communication means between clients and servers, or use of mobile applications interacting over a mobile data network with a one or more dedicated servers are all possible within the scope of the invention. Accordingly, all references to web services, web servers, application servers, and an Internet should be taken as exemplary rather than limiting, as the inventive concept is not tied to these particular implementation choices.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1. there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area 10 network, a local area network, a wireless network, the Internet, or any other network, using known protocols for such communication, whether wireless or wired.

In one embodiment, computing device 100 includes one or more central processing units (CPU) 102, one or more interfaces 110. and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as. for example. caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network, other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire, PCI, parallel, radio frequency (RF), Bluetooth, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (I-ISSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java compiler and may be executed using a Java virtual machine or equivalent, or files containing higher level code that may be executed by the computer using an interpreter (for example, scripts written in Python, Perl, Ruby, Groovy, or any other scripting language).

Figure 2:
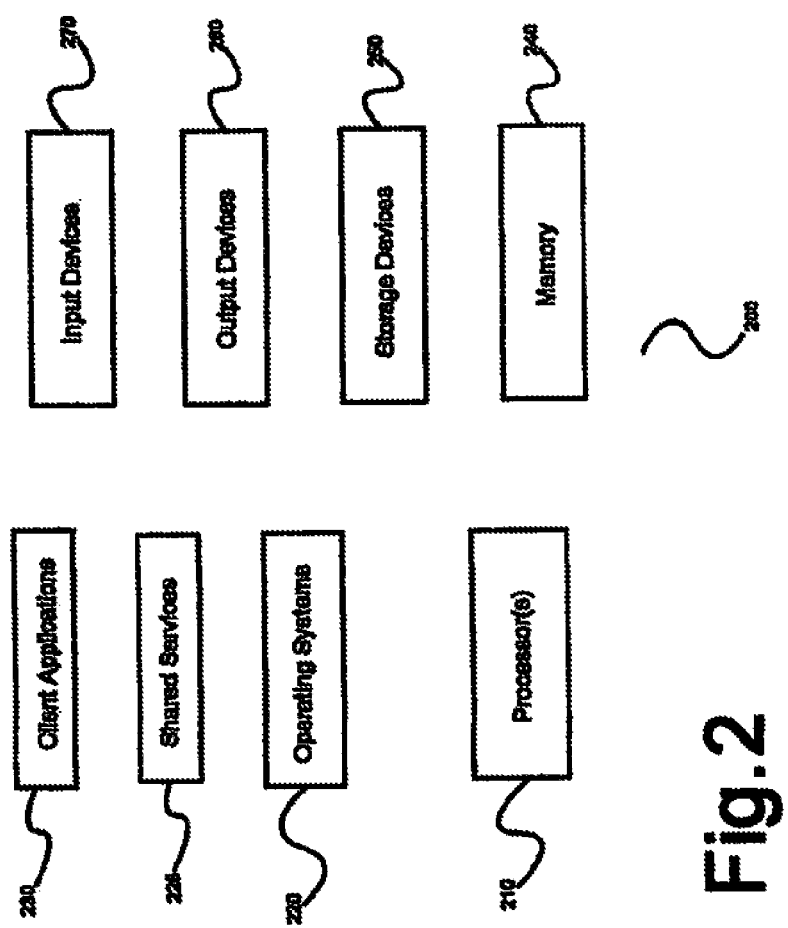
FIG. 2 is a block diagram illustrating an exemplary logical architecture for a client device, according to various embodiments of the invention.

In some embodiments, systems according to the present invention may be implemented on a standalone computing system. Referring now to FIG. 2, there is shown a block diagram depicting atypical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows operating system, Apple's Mac OS/X or iOS operating systems, some variety of the Linux operating system, Google's Android operating system, or the like. In many cases, one or more shared services 225 may be operable in system 200, and may be useful for providing common services to client applications 230. Services 225 may for example be Windows services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
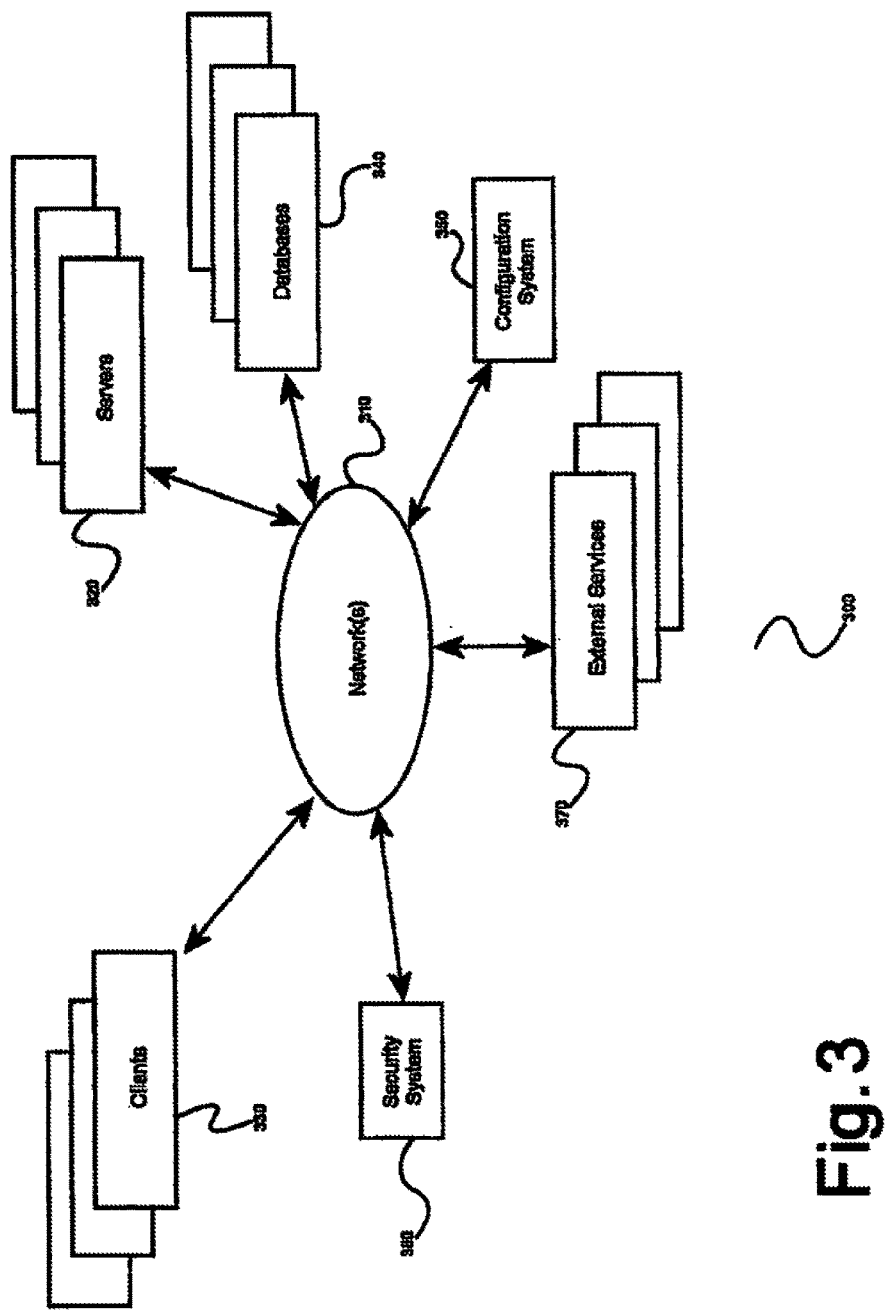
FIG. 3 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, and so forth). In some embodiments variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated 30 with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules can be variously implemented to run on server and/or client components.

Description of System Architecture

Figure 4:
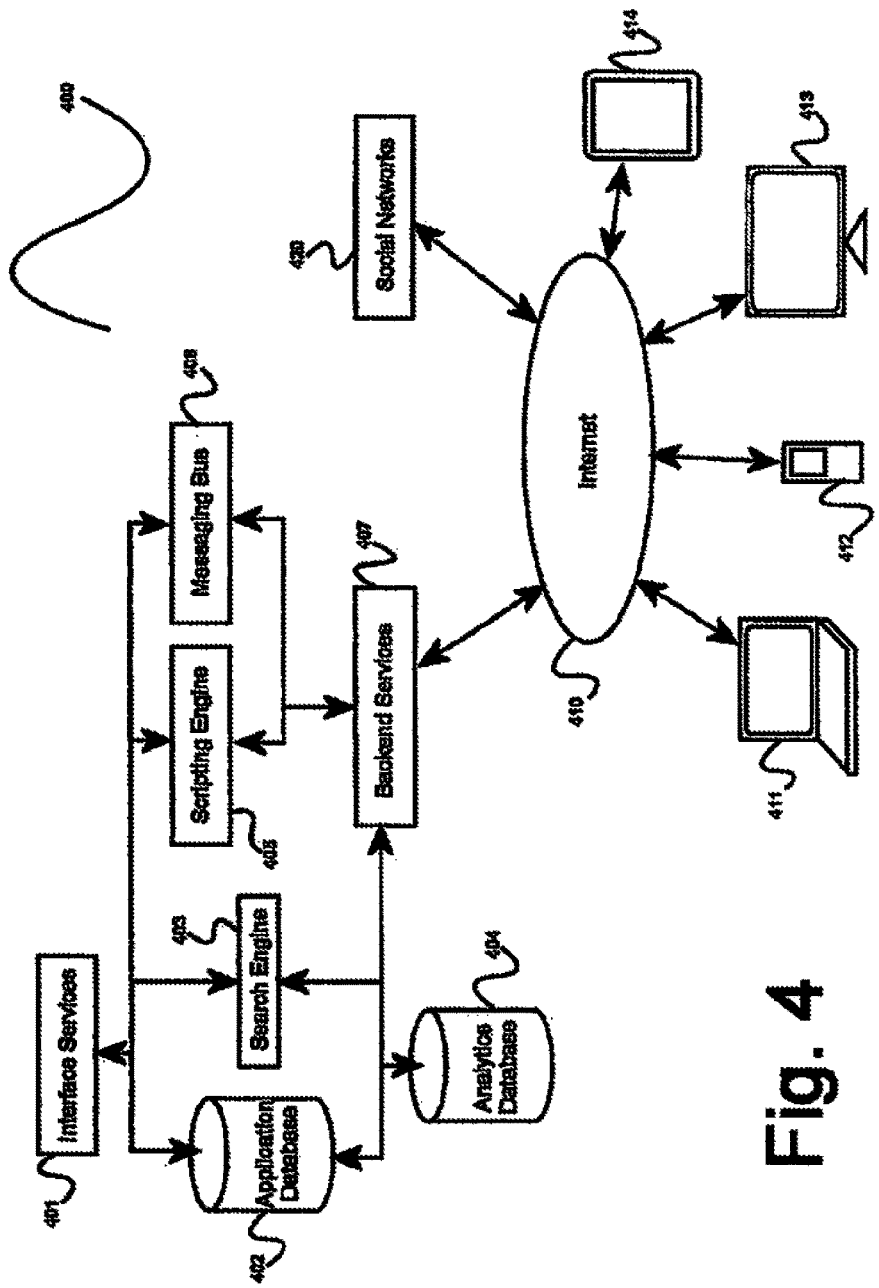
FIG. 4 is a block diagram of front-end applications for brand management, according to a preferred embodiment.

FIG. 4 is a block diagram illustrating an exemplary architecture of a system 400 for providing brand management services using data aggregated from social media networks 420, according to a preferred embodiment of the invention. According to the embodiment, system 400 may be accessed by users via Internet 410 or an equivalent network (or in some embodiments a plurality of networks such as Internet 410), using a plurality of computing devices, such as a laptop computer 411, mobile phone or smartphone 412, a terminal or kiosk 413, or a tablet computer 414. Data from social networks 420 is collected and processed by backend services 407 such as web crawlers, information gatherers, processors, indexers, a behavior engine, and a recommendation engine. Data processed by backend services 407, such as social network client applications or "crawlers" which search for and retrieve data from social networking services, may then be stored in a plurality of data storage systems 402 such as a MySQL or other relational database, or distributed non-relational databases 404 such as Hadoop HBase. Stored data may be searchable via a search engine 403 such as Apache™ Lucene. Data may be accessed by a user via interface services 401, typically comprising a web server, which may be any of the many well-known web server types known in the art, for example Microsoft™ Internet Information Server, Apache™ Web Server, IBM Web Sphere Server, and so forth. It will be appreciated by one having ordinary skill in the art that any web server capable of receiving standard web interaction requests (typically but not necessarily made using hypertext transfer protocol HTTP or equivalent standard protocols) and serving web content to the requestor may be used according to the invention. Scalable architecture elements which may include such elements as a scripting engine 405 such as Apache™ Thrift to create and manage services between a plurality of software languages internally (such as PHP, Rails, or C++ and derivatives) or messaging bus 406 such as Java™ Message Service (JMS) or Apache™" ActiveMQ for handling communication between services and utilizing multiple data store architectures may be implemented, for example implemented as a messaging software module 406 stored and operating on a network-attached application server 450. In some embodiments, scripting engine 405 and messaging software module 406 may be implemented together as software services running on application server 450. It will be appreciated by one having ordinary skill in the art that such software elements as have been mentioned are exemplary, and many varied solutions for such roles exist and are in development, any of which may be used interchangeably to build a backend infrastructure. It will be further appreciated that such elements may be omitted entirely from system 400 and their roles carried out by other components. Users accessing system 400 may do so via a number of web-capable devices, each of which may have an off-the-shelf or optimized interface application such as a mobile web browser on a smartphone 412. Users accessing in such a way will be able to view collected social network data presented by a backend 407 embedded within contextually-relevant webpages, as determined by backend services 407 and selected for implementation via front-end 401. In some embodiments, integration to third party services 461, such as customer relationship management (CRM) services and the like, may be achieved via one or more third party service integration software modules 460. For example, it is often preferable that users of a primary system such as a CRM system 461 do not have to learn different user interface conventions when using add-on products or services from within the primary system. Thus, for example, a user viewing content aggregated from multiple social networks according to the invention would be able to do so, according to the embodiment, within a primary system 461 such as a CRM system, using familiar user interface conventions and elements of the primary system.

Figure 5:
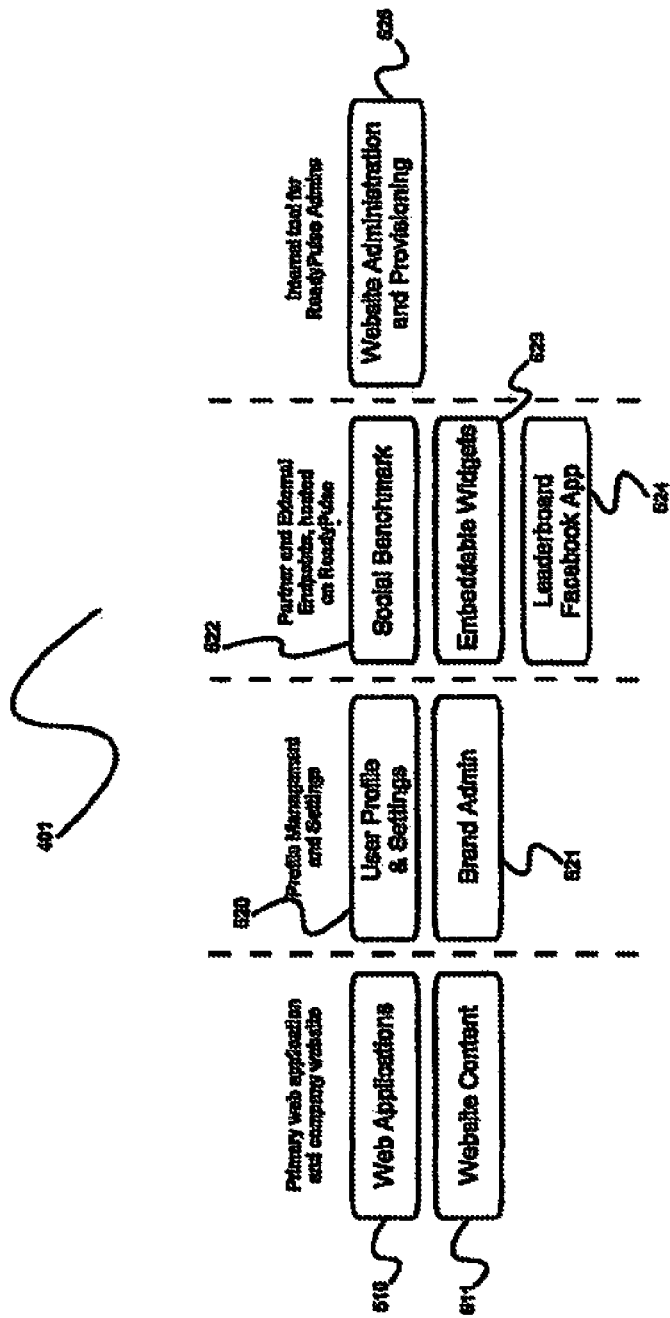
FIG. 5 is a block diagram of a software front-end stack, according to a preferred embodiment.

FIG. 5 is a block diagram illustrating user interface services 401 comprising a plurality of front-end applications according to a preferred embodiment. According to the embodiment, a user may utilize a variety of applications to interact with a company website, manage his user profile and associated data, manage one or more endpoints for user interaction (for example, configuring front end services to be able to interact via the user's mobile device as well as via the user's computer), and access an internal administration tool for accessing and managing aggregated social network data within the system. A user may interact with web applications 510 such as a brand advocacy builder and social analytics software, which present data aggregated from social networks which is relevant to the user's industry or company. A user may also view website content 511 such as their homepage and other static webpage content, allowing the viewing of content as it would be seen by a visitor to the webpage. This would allow a user to monitor the appearance of their brand and view what information is being presented to other viewers, so that they may adjust accordingly via other front-end applications such as those for managing their user profile and settings 520 and brand admin 521. With these tools, a user can manage their profile within the system and set goals pertaining to brand or product management. These goals are associated with metrics for scoring aggregated social network data such that only high-scoring data is presented to the user. A user may also use the front-end to view hosted endpoints such as social benchmarks 530, embeddable widgets 531 which include embeddable code for placement into a webpage, and leaderboard Facebook™ apps 532. According to a preferred embodiment, exemplary code for an embeddable widget 531 may be written as follows;

```
<div id='rpdiv5'</div><script
src=12up://www.readypulse.camds/iframe.js?divid=rpdiv&curation=52&size=wehui&theme
    =&geturl=0&token=ccontent&width=640&height=' type='text/javaseript5</script>
```

The above code describes the widget for embedded placement in a webpage, to display contextually-relevant social networking data such as product testimonials and reviews. This data is not a direct feed from sources such as Twitter™ or Facebook™ posts, it is monitored and scored by and only high-scoring content is selected to maximize relevance and usefulness to a viewer. Furthermore, such a widget may be capable of multi-channel integration—that is, a widget may incorporate information from a plurality of different sources which may be spread across a plurality of social media networks and formats, and combine them into a single widget interface for consolidated viewing. A user may also use the front-end to access an internal tool 525 for website administration and provisioning, which will allow the configuration of data displayed to website viewers. It will be appreciated by one having ordinary skill in the art, of course, that there are many variations on such embed code that could be utilized, according to the invention; the code listed here is merely exemplary.

Figure 6:
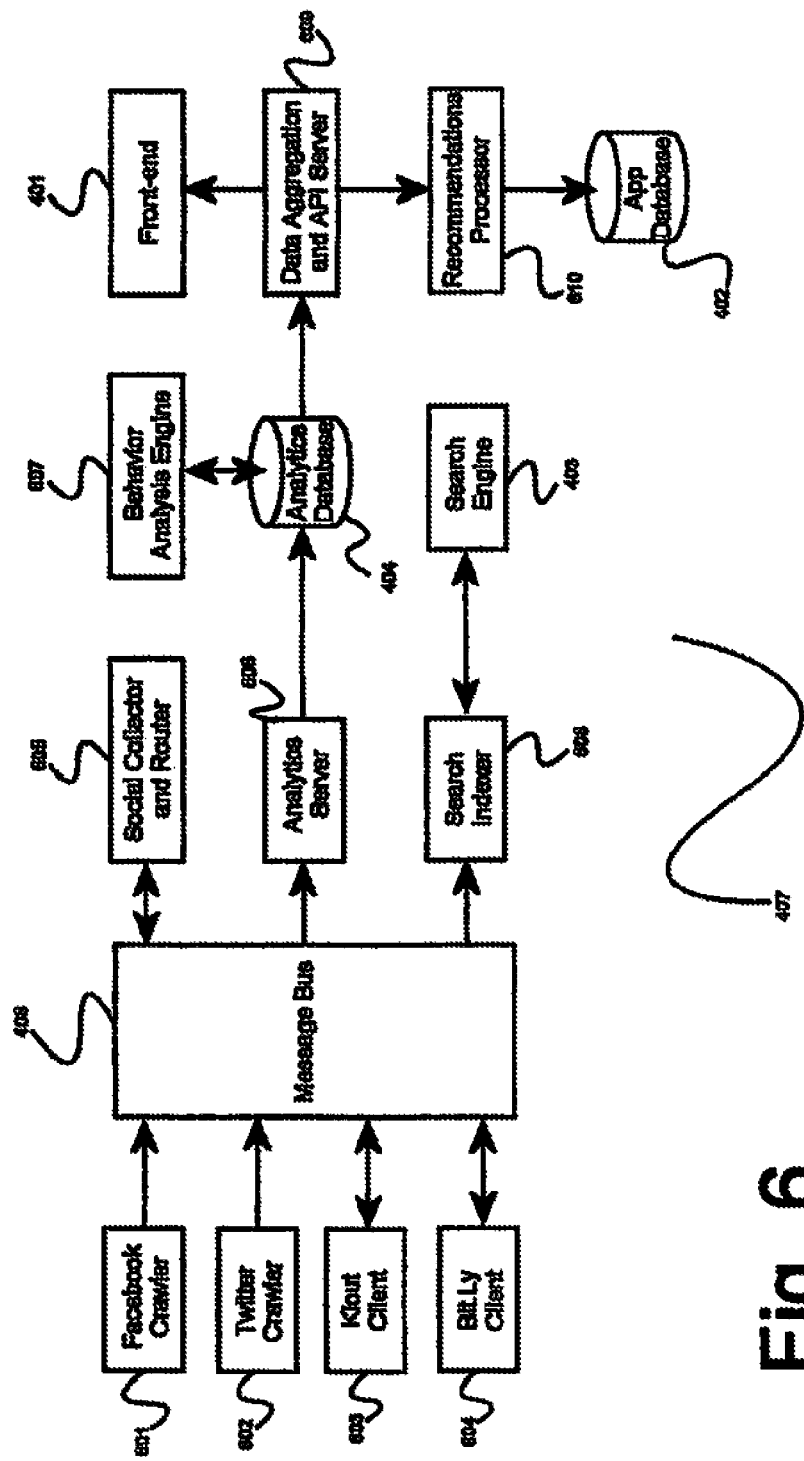
FIG. 6 is a block diagram of a back-end architecture, according to a preferred embodiment.

FIG. 6 is a block diagram illustration of the backend 407, comprising a plurality of social data aggregator services such as a Facebook™ crawler 601, Twitter crawler 602, Klout™ client 603, and Bit.ly™ client 604, each of which may connect to its respective social media network to search for, request, or retrieve data such as a customer's personal attributes (name, gender, location, or other relevant and useful data), posts containing relevant product or service testimonial content, or posts containing relevant content pertaining to a company's competitors. It will be appreciated that such services are exemplary and that many more are possible according to the invention and that services may be added or omitted as appropriate as long as the core functionality of social network monitoring and data collection is performed. These services then interface via a one- or two-way data transfer to an internal message bus 406 such as Apache™ ActiveMQ, which handles the communication between data collectors and data storage and processing via services such as the illustrated social collector and router 605, analytics server 606, and search indexer 608 which interacts with data retrieval and search libraries such as Apache™ Lucene or Elasticsearch™ Analytics server 606 stores analyzed data in a database 404 such as Hadoop HBase, which stores data for and from a behavioral analysis engine 607 such as Hadoop. This data is then utilized by a data aggregation and API server 609, which controls presentation of the data to the front-end 401 and a recommendations processor 610, which then stores recommendation data in a database 402 such as for example a MySQL relational database. As previously described, collected data may be from a plurality of sources potentially across a plurality of social media networks, and in such instances where multi-channel content is being collected, a common scoring system may be utilized such that a common scoring system may be used according to behavioral analysis and engagement of content by an audience. It will be appreciated that this arrangement is exemplary, and such a data store need not be physically separate from database 404, and further that additional distributed data storage may be utilized within the scope of the invention. Report generator server 620 prepares and makes available to users a plurality of reports specific to one or more brands managed by the user. Typically, reports comprise at least an indicia of content value, an indicia of audience value, and at least one recommendation to assist the user in improving perception of or engagement with the one or more brands by social network members.

Figure 7:
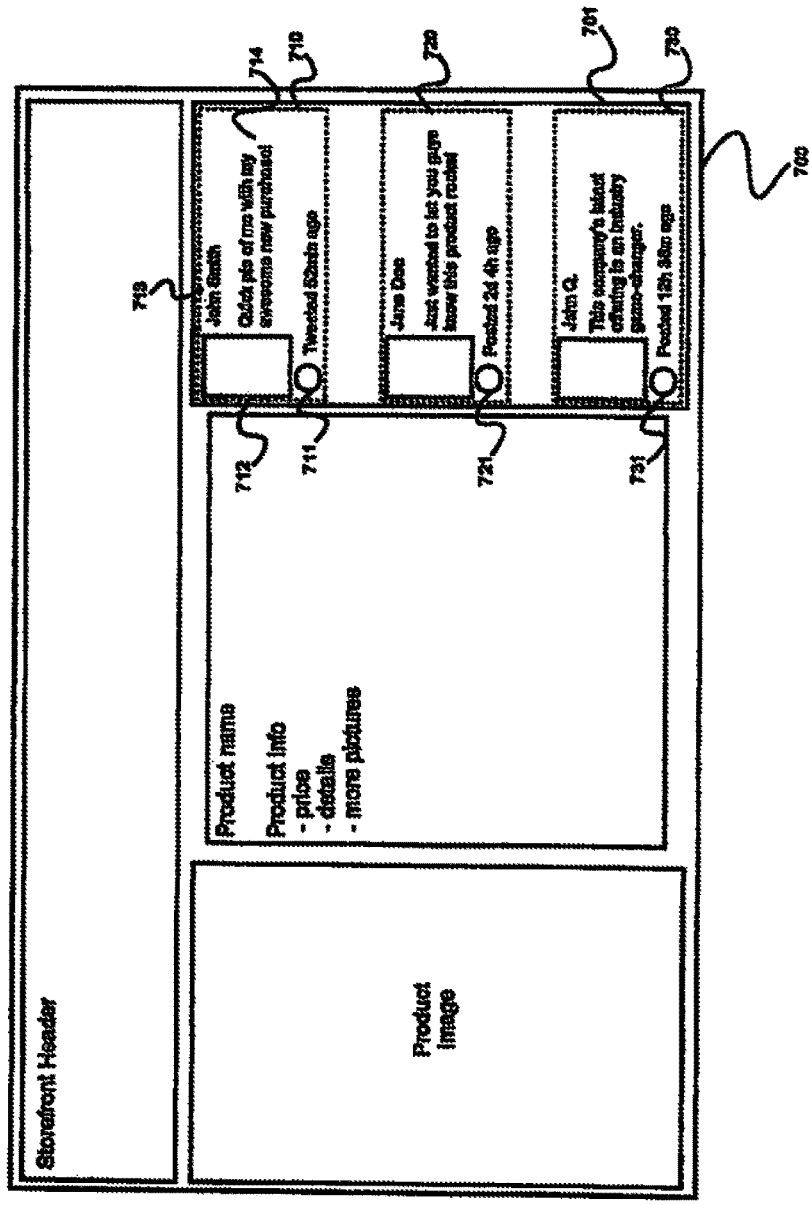
FIG. 7 is an illustration of a webpage with embedded testimonials, according to an embodiment of the invention.

FIG. 7 is an illustration of an exemplary storefront webpage 700, demonstrating the output of using embedded widget code as described previously to add relevant information to a product page, increasing its appeal to a potential customer viewing a virtual storefront online. A webpage frame 701 is present, which displays contextually-relevant social network posts and data as determined by backend services. Exemplary content displayed as illustrated may comprise Twitter™ posts ("tweets") 710, identifiable by an icon 711 displaying the Twitter™ logo, Facebook™ posts 720 identifiable via an icon 721 displaying the Facebook™ logo, or LinkedIn™ posts 730 as identified by an icon 731 displaying the LinkedIn™ logo. Such posts may display data useful to a viewer, such as the poster's name 713, post content text 714, and when applicable a photograph of the poster 712. Unlike a traditional "feed", these posts are not streamed directly from their sources but have already been processed and selected by backend processes for relevance to the webpage content. Such postings may be integrated directly into an e-commerce storefront, enabling postings to be linked directly with products or services, and enabling "tagging" of product or service information with testimonial data.

Figure 8:
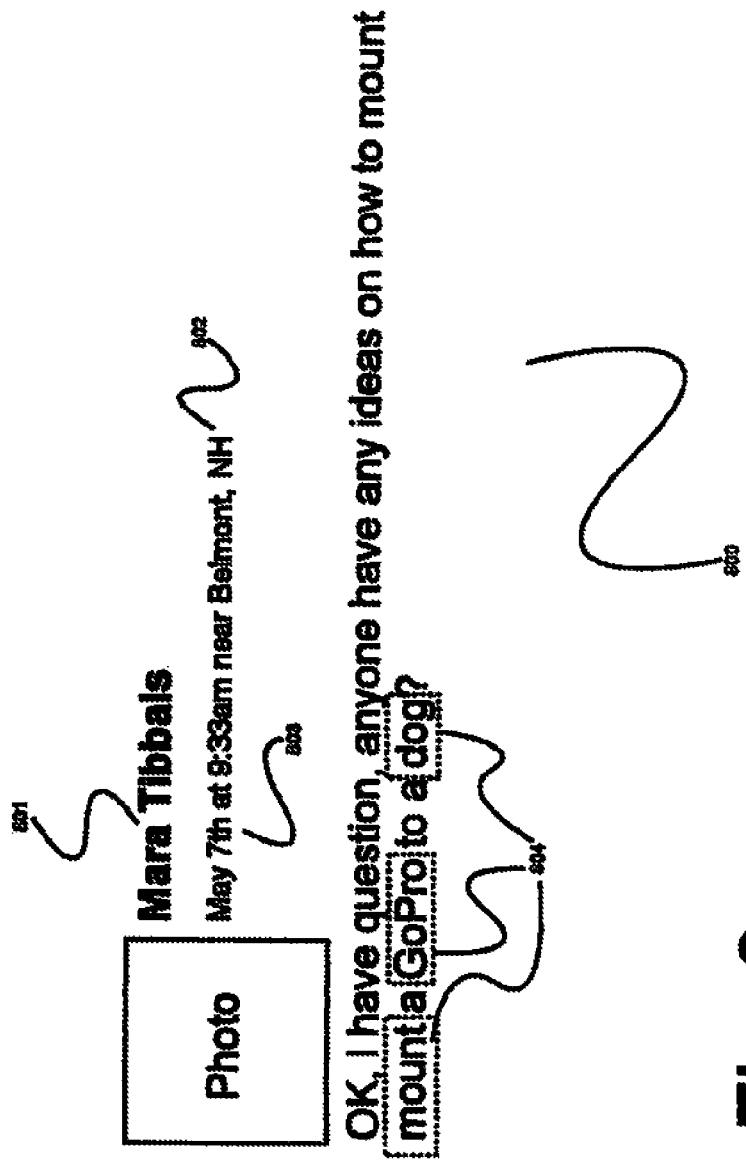
FIG. 8 is an illustration of a social customer's content, with contextual data shown according to a preferred embodiment, according to an embodiment of the invention.

FIG. 8 is an illustration of an exemplary social media posting 800 as one might be viewed by a social networking user or as it may appear to a service retrieving data from a network such as crawlers previously described, illustrating exemplary data that may be utilized by backend processes in scoring against metrics such as relevance and determining content usefulness for embedding into a webpage via a code widget as previously described. A social network posting traditionally includes several articles of information, such as the poster's name 801, which may be used to determine gender, compare against a list of known individuals in the industry, or other processing. Also displayed are the posting location 802, which may be used to score relevance within local markets, and posting date and time 803 which may be used to determine patterns in posting behavior and relevance of the post. The post content may be checked for keywords 804 which give indication as to the topic of the post, relevance to key markets or products, and allow further processing to determine the nature and relevance of the post. Information from such a posting may be used to determine testimonial or endorsement scoring by backend services 407 according to a variety of information as described above, such as personal identifiers regarding a poster or stored data within a poster's browser session information or cookies—optionally mapping a plurality of attributes to a posting immediately based on known factors about a posting source. In this way it may be possible to identify and personalize posting content and use this personalization to develop and maintain a store of known advocates or "top posters", posters which maintain high scores for engagement or brand advocacy. For example, behavioral analysis engine 607 may obtain a plurality of content elements generated by a first member of one or more social networks and analyze the first member's social behavior using the acquired content elements in order to compute an indicia of an audience value of the first member. Furthermore, such information may enable a user to track, score, organize, and index testimonials and other postings based on their identifiers, further expanding functionality. It will be appreciated by one having skill in the art that such metrics are exemplary, and there are many ways to utilize and process such data according to the invention.

Figure 11:
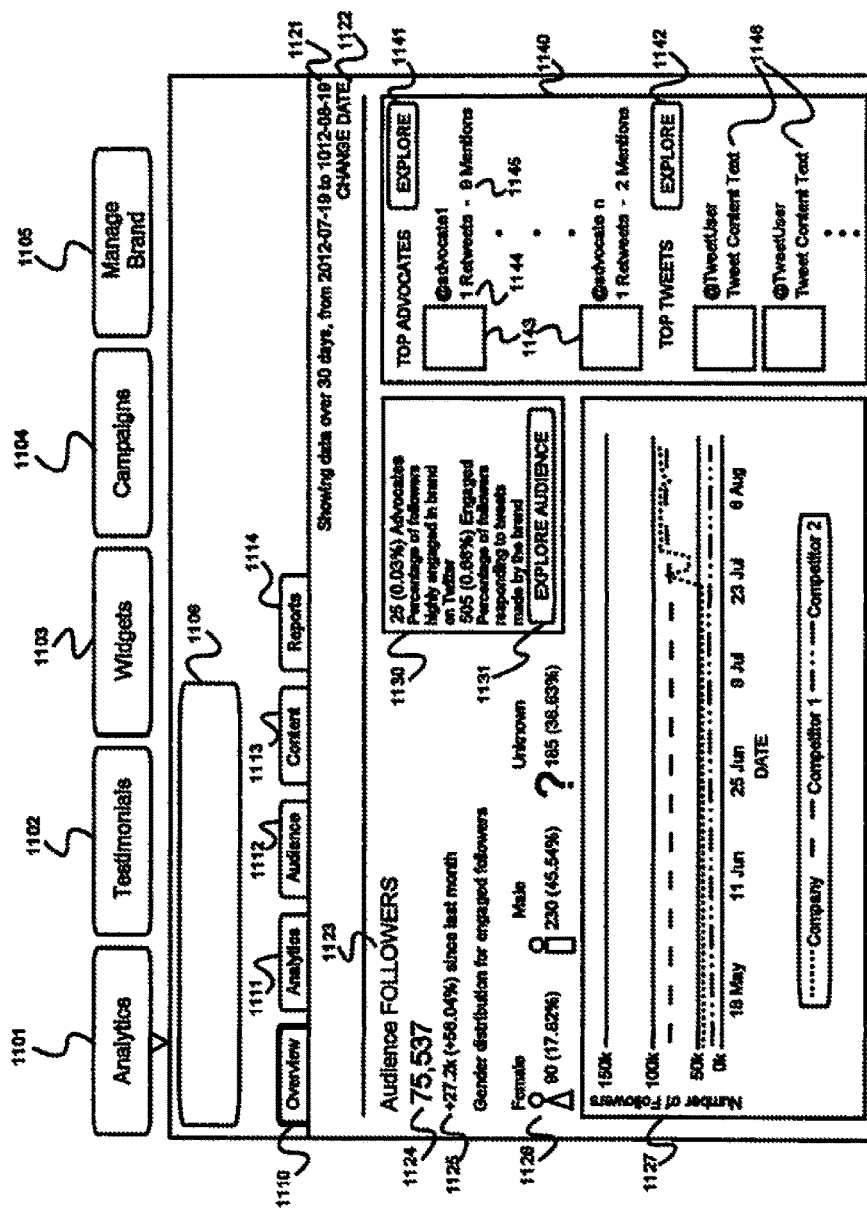
FIG. 11 is an illustration of an exemplary web-based user interface, according to an embodiment of the invention.

FIG. 11 is an illustration of an exemplary web interface 1100 for a web-based front-end application 510. As illustrated, application interface 1100 may comprise a plurality of selectable categories such as Analytics 1101, Testimonials 1102, Widgets 1103, Campaigns 1104, or Manage Brand 1105, each of which may be selected by a user to tailor the displayed content, and each of which will be illustrated and described in detail. Referring to FIG. 11, an Analytics tab 1101 may display content comprising a company name, logo, or other identifying mark 1106, as well as further selectable tabs such as Overview 1110, Analytics 1111, Audience 1112, Content 1113, or Reports 1114, each of which will be illustrated and described in detail. As illustrated, an Overview tab 1110 may present data comprising a date range 1121 which may alert a user to the range of data being displayed, a clickable button or other User Interface (UI) element 1122 for changing such a date range, a text element 1123 which may alert a user to the currently-displayed audience information such as Twitter™ or Facebook™ followers, a further text element 1124 which may present a user with a number representing a total sum or other metric of a selected audience, a further text element 1125 which may provide a user with a relative metric indicating change in a total sum 1124, a group of text, image, or other UI elements 1126 which may represent organization groupings of a selected audience (such as gender distribution, as illustrated), a graph or other image element 1127 which may illustrate a comparative analysis of a user's brand against chosen competitors according to a selected audience and using known metric data for such an audience, a UI element 1130 which may present a user with a breakdown of known metrics within a selected audience, and a sidebar or other grouping element 1140 which may present a user with more detailed information pertaining to a currently-selected audience. It will be appreciated by one having ordinary skill in the art that such elements and their arrangement are exemplary, and that a variety of UI arrangements are possible according to the invention, and that the specific arrangement may be user-configurable and variable depending on several factors such as a web browser or internet-capable device being used (for example, a desktop personal computer might display information differently than a smartphone). As illustrated, a breakdown element 1130 may further comprise a clickable or selectable button or other UI element 1131 allowing a user to explore a currently-selected audience, which might present a pop-up window or a new tab in a web browser, presenting further information regarding an audience. A grouping element 1140 may further comprise a plurality of clickable or selectable buttons or similar UI elements 1141 and 1142, which might allow a user to further explore organization categories of an audience such as (as shown) top-rated advocates or top-rated tweets, as selected for display based on known metrics and data gathered and processed by backend services 407, and selected high-rated (As determined by backend services 407) social media network postings may be displayed. As illustrated, a poster's information might be presented to a user for viewing, and such information might comprise a poster's profile picture 1143, a count of "retweets" 1144 or "mentions" 1145, illustrating a poster's interest in or loyalty to a user's brand, or tweet content 1146 such as text postings including keywords or phrases relevant to a user's brand. It will be appreciated that such postings and textual content illustrated is purely exemplary, and that the actual content of postings and displayed content may vary widely.

Figure 12:
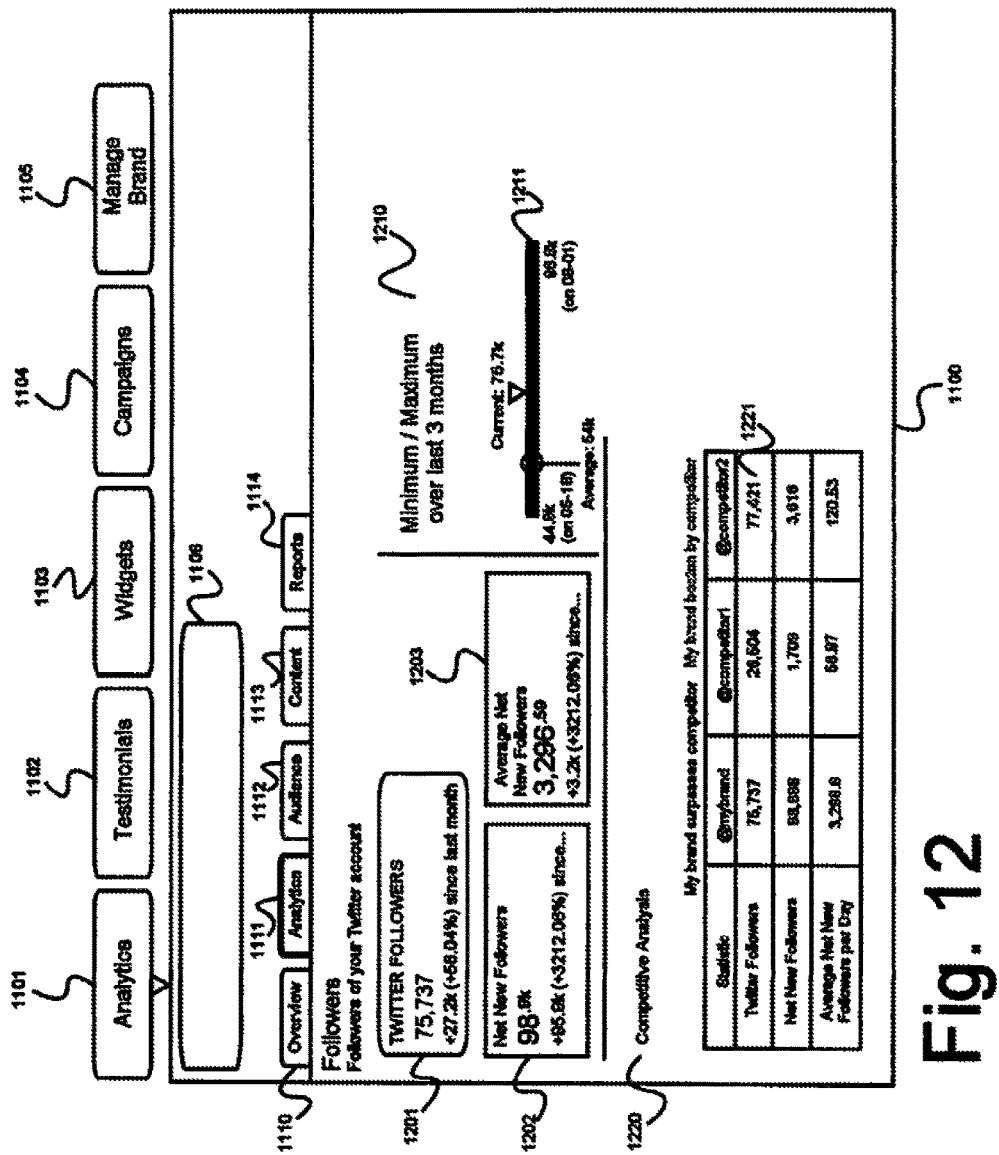
FIG. 12 is an illustration of an exemplary web-based user interface, according to an embodiment of the invention.

FIG. 12 is an illustration of an exemplary web interface 1100 for a web-based front-end application 510, particularly of an Analytics tab 1111 within an Analytics category 1101. As illustrated previously, an Analytics category 1101 may display content comprising a company name, logo, or other identifying mark 1106, as well as further selectable tabs such as Overview 1110, Analytics 1111, Audience 1112, Content 1113, or Reports 1114. An Analytics tab 1111 may further display content comprising organizational or grouping UI elements displaying total number of Twitter™ followers 1201, net increase of such followers within a selected timeframe 1202, average net increase in followers within a selected timeframe 1203, a graph or other image element 1211 representing metric information such as (as illustrated) minimum, maximum, and average followers, a title element 1210 for such a graph, and a further graph or image element 1220 illustrating a competitive analysis of a chosen metric (again, as illustrated in this exemplary interface, Twitter™ followers) compared against selected competitors within a user's industry. Such elements may be clickable or selectable, or otherwise able to be interacted with by a user, such as to tailor their content—for example, a user might be able to click on a UI element 1202, allowing user to alter the timeframe being represented in the element's content. It will be appreciated by one having ordinary skill in the art that such elements and their arrangement is exemplary, and arrangements and specific construction or content may vary according to the invention, and such variances may be necessary according to a variety of factors not relevant to or claimed by the invention—such as, as previously mentioned, a specific web browser or device a user is viewing an interface 1100 with.

Figure 13:
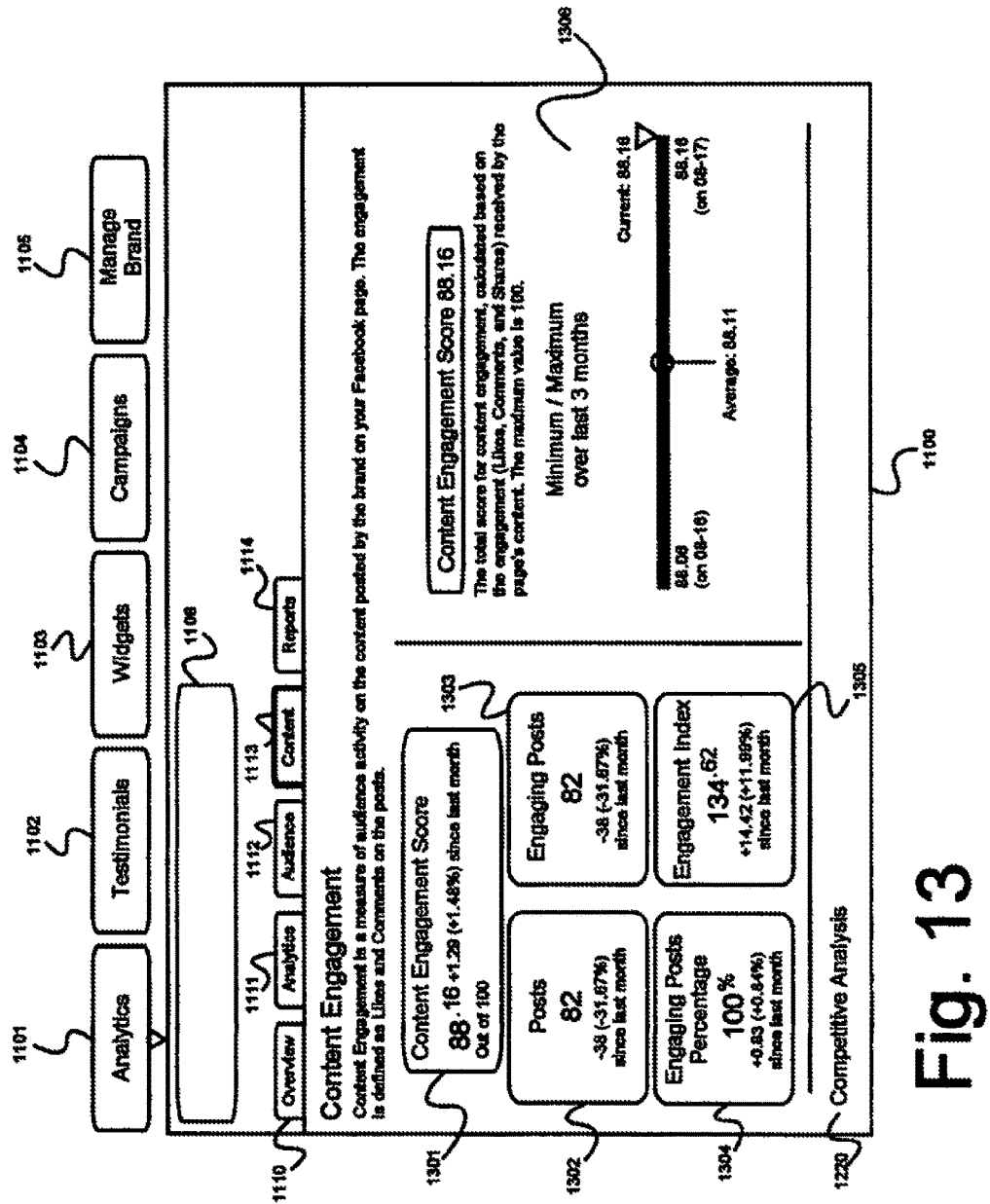
FIG. 13 is an illustration of an exemplary web-based user interface, according to an embodiment of the invention.

FIG. 13 is an illustration of an exemplary web interface 1100 for a web-based front-end application 510, particularly of a Content tab 1113 within an Analytics category 1101. As illustrated previously, an Analytics category 1101 may display content comprising a company name, logo, or other identifying mark 1106. as well as further selectable tabs such as Overview 1110, Analytics 1111, Audience 1112, Content 1113, or Reports 1114. As illustrated, a Content tab 1113 may display content comprising UI elements displaying an overall "Content Engagement Score" 1301 as determined by an analytics server 606 using known data and metrics, total number of social media networking posts 1302, number of engaging posts 1303 as determined by an analysis of post content by an analytics server 606, percentage of posts which are qualified as "engaging" 1304, and an overall "engagement index" 1305 representing a comparative quantification of a user's brand engagement within a social media network to facilitate quick comparison against previously-reported engagement indices, a competitive analysis graph or similar element 1220 as described previously, providing a comparison of a user's brand against selected competitor brands with reference to a chosen metric, and a graph or similar image element 1306 illustrating minimum, maximum, and average content engagement scores within a specified timeframe, permitting a user to immediately compare current standing of a brand against previously-reported scores. Such elements may be clickable or selectable, or otherwise able to be interacted with by a user, such as to tailor their content—for example, a user might be able to click on a UI element 1301, allowing user to alter the timeframe being used for comparison in the element's content. It will be appreciated by one having ordinary skill in the art that such elements and their arrangement is exemplary, and arrangements and specific construction or content may vary according to the invention, and such variances may be necessary according to a variety of factors not relevant to or claimed by the invention—such as, as previously mentioned, a specific web browser or device a user is viewing an interface 1100 with.

Figure 14:
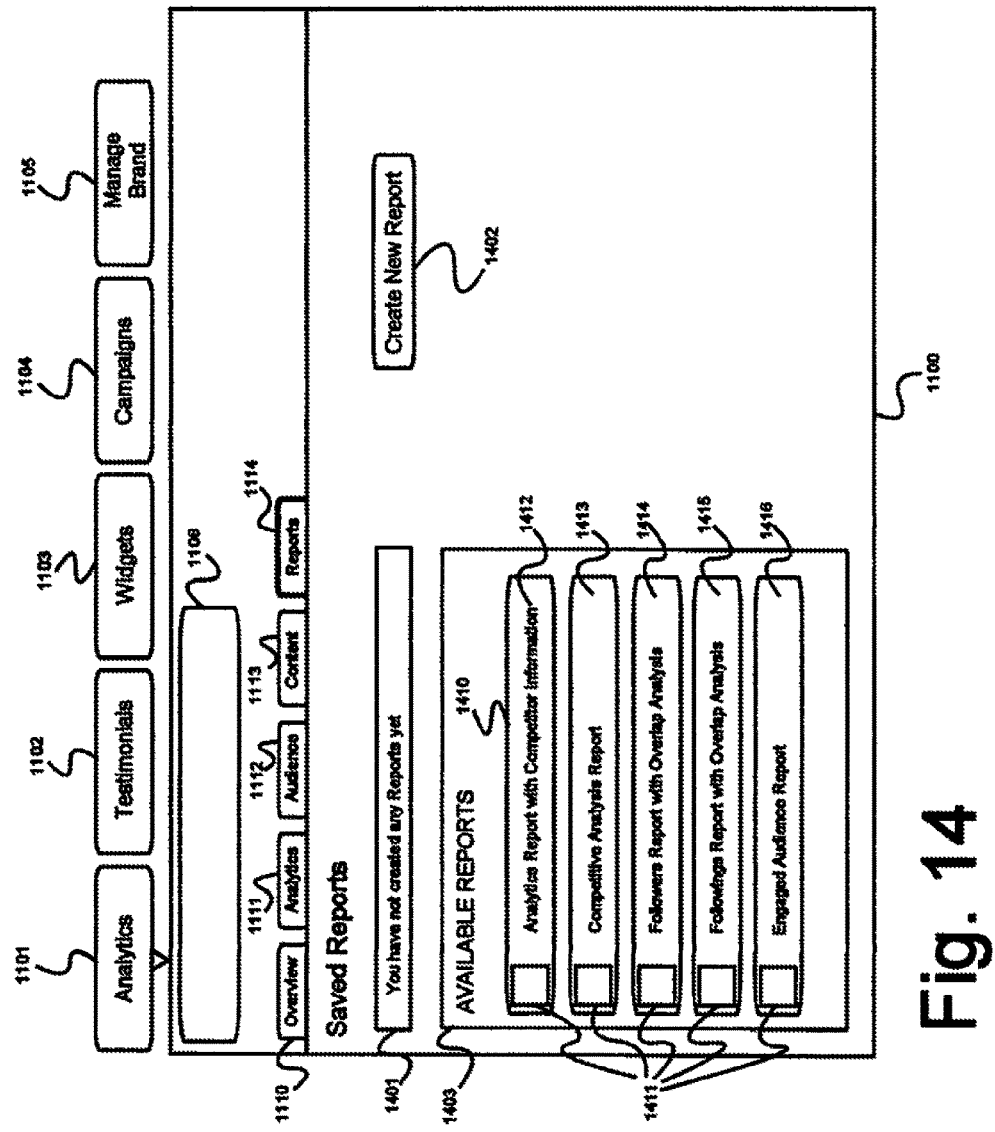
FIG. 14 is an illustration of an exemplary web-based user interface, according to an 20 embodiment of the invention.

FIG. 14 is an illustration of an exemplary web interface 1100 for a web-based front-end application 510, particularly of a Reports tab 1114 within an Analytics category 1101. As illustrated previously, an Analytics category 1101 may display content comprising a company name, logo, or other identifying mark 1106, as well as further selectable tabs such as Overview 1110, Analytics 1111, Audience 1112, Content 1113, or Reports 1114. As illustrated, a Reports tab 1114 may display content comprising a text element 1401 displaying existing or previously-generated reports or (as illustrated in this exemplary interface) an alert notifying a user that no reports have been generated, a clickable or otherwise interactive button or similar element 1402 allowing a user to generate a new report, and a table or similar element 1403 displaying a selection of potential report types which may be generated. As illustrated, exemplary report types may include but are not limited to an analytics report with competitor information 1412 which may display a comparative analysis of a user's brand's standing relative to selected competitors within an industry, competitive analysis report 1413 which may focus on an analysis only of chosen competitors, followers report with overlap analysis 1414 which may analyze followers of a user's brand and any overlap (if any) with competing brands, followings report with overlap analysis 1415 which may analyze what other brands a user's followers are following and any overlap (if any) with competitors, or an engaged audience report 1416 which may focus on followers of a user's brand that are determined to be "engaged" by an analytics server 606. Exemplary report types may also be displayed next to an icon or similar image element 1411, representing a file type which will be used for a generated report if selected. It will be appreciated by one having ordinary skill in the art that such elements and their arrangement is exemplary, and arrangements and specific construction or content may vary according to the invention, and such variances may be necessary according to a variety of factors not relevant to or claimed by the invention—such as, as previously mentioned, a specific web browser or device a user is viewing an interface 1100 with. It will be further appreciated that the report types shown are exemplary, and a wide variety of report types may be possible according to the invention, as a wide variety of information and combinations of data may be desirable to include in a report, and that such report types may be user-configurable such that a user may extend the functionality of an interface 1100 by tailoring available report types to their industry, brand, or any other customization which may be desirable or beneficial to a user.

Figure 15:
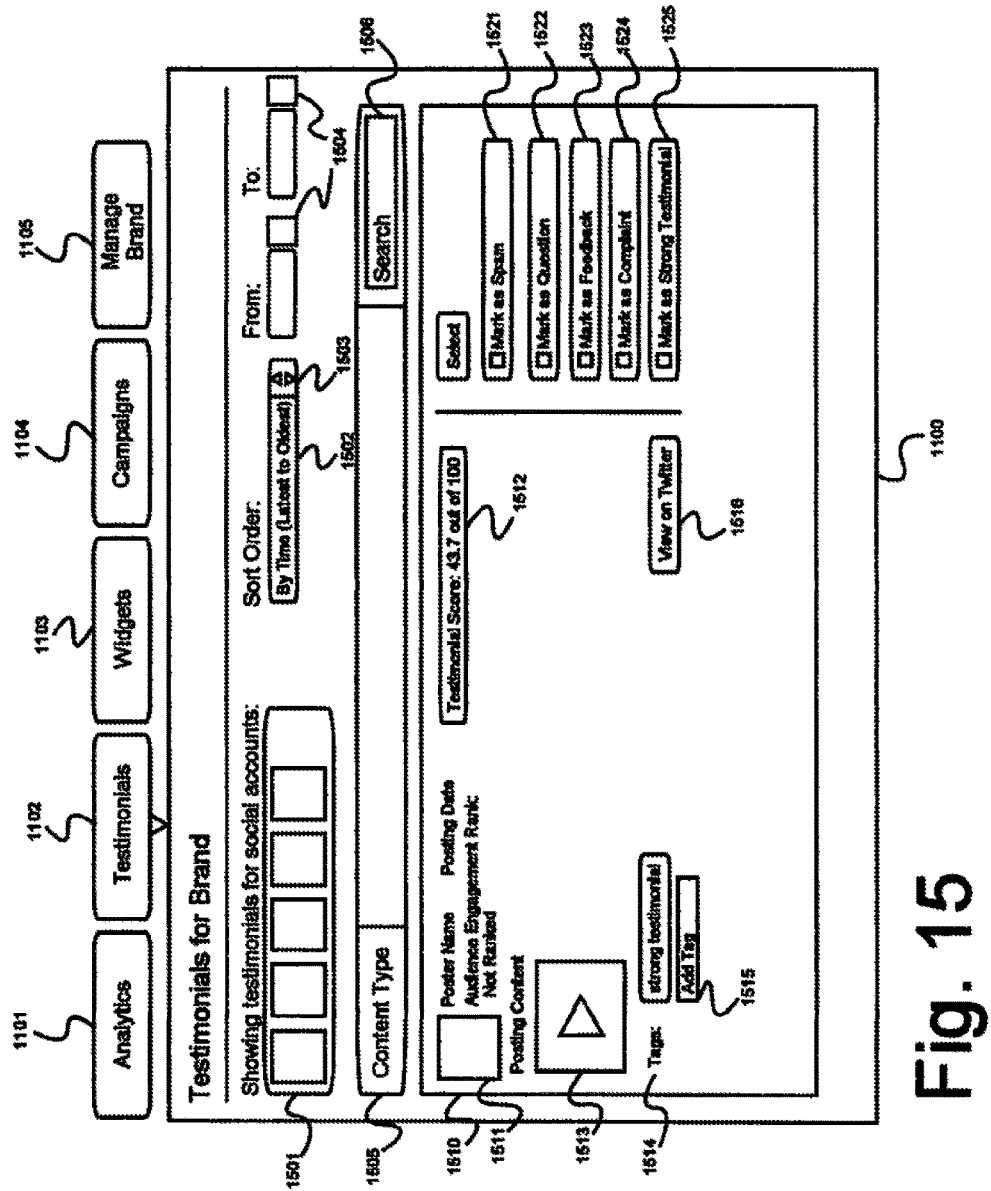
FIG. 15 is an illustration of an exemplary web-based user interface, according to an embodiment of the invention.

FIG. 15 is an illustration of an exemplary web interface 1100 for a web-based front-end application 510, particularly of a Testimonials category 1102. As illustrated previously, an Analytics tab 1101 may display content comprising a company name, logo, or other identifying mark 1106, as well as further selectable tabs such as Overview 1110, Analytics 1111, Audience 1112, Content 1113, or Reports 1114. As illustrated, a Testimonials category 1102 may display content comprising a text- or image-based list 1501 of displayed social media networks, a drop-down or similar menu element 1502 for sorting displayed content postings which may have a clickable or otherwise user-interactive button or similar element 1503 for expanding a drop-down menu, text fields displaying date information which may have clickable or otherwise user-interactive button or similar elements 1504 for selecting a date range from which to display content postings, a header section displaying content posting type 1505, a search box 1506 where a user may enter text to search for within content postings being displayed, and a body section 1510 which may display individual content postings and their content. Exemplary posting content may comprise a poster's personal information 1511 such as a profile image, username, date a post was made, or other relevant personal information as well as an Audience Engagement Rank, which scores the degree of engagement of a displayed poster relative to other members of an audience, as may be determined by one or more backend services 407. Further content which may be displayed may include (but is not limited to) a testimonial score 1512 which may rank a testimonial for relevance as determined by one or more backend services 407, embedded posting content 1513 such as video or audio clips which may be playable directly from within interface 1100, post tags 1514 as well as a text field or similar element 1515 which may allow a user to add custom tag for further identifying or grouping postings, and a clickable or otherwise user-interactive button or similar element 1516 which may allow a user to view a posting directly in its native environment (such as, for example, viewing a Twitter™ post on the Twitter™ website rather than from within interface 1100). Further content which might be displayed within a body element 1510 may include (but need not be limited to) a plurality of clickable, selectable, or otherwise user-interactive buttons, checkboxes, or similar interactive elements allowing a posting to be marked or flagged according to content type—as illustrated, such types might include spam 1521, question 1522, feedback 1523, complaint 1524, or strong testimonial 1525, each of which may alter the manner in which a posting may be presented to a user—for example, marking a post as "spam" may prevent it from appearing in further lists or views, or marking it as a "strong testimonial" might alter various metrics making use of ratings or scoring of postings, which may then be displayed in various views or aspects of an interface 1100. It will be appreciated by one having ordinary skill in the art that such elements and their arrangement is exemplary, and arrangements and specific construction or content may vary according to the invention, and such variances may be necessary according to a variety of factors not relevant to or claimed by the invention—such as, as previously mentioned, a specific web browser or device a user is viewing an interface 1100 with.

Figure 16:
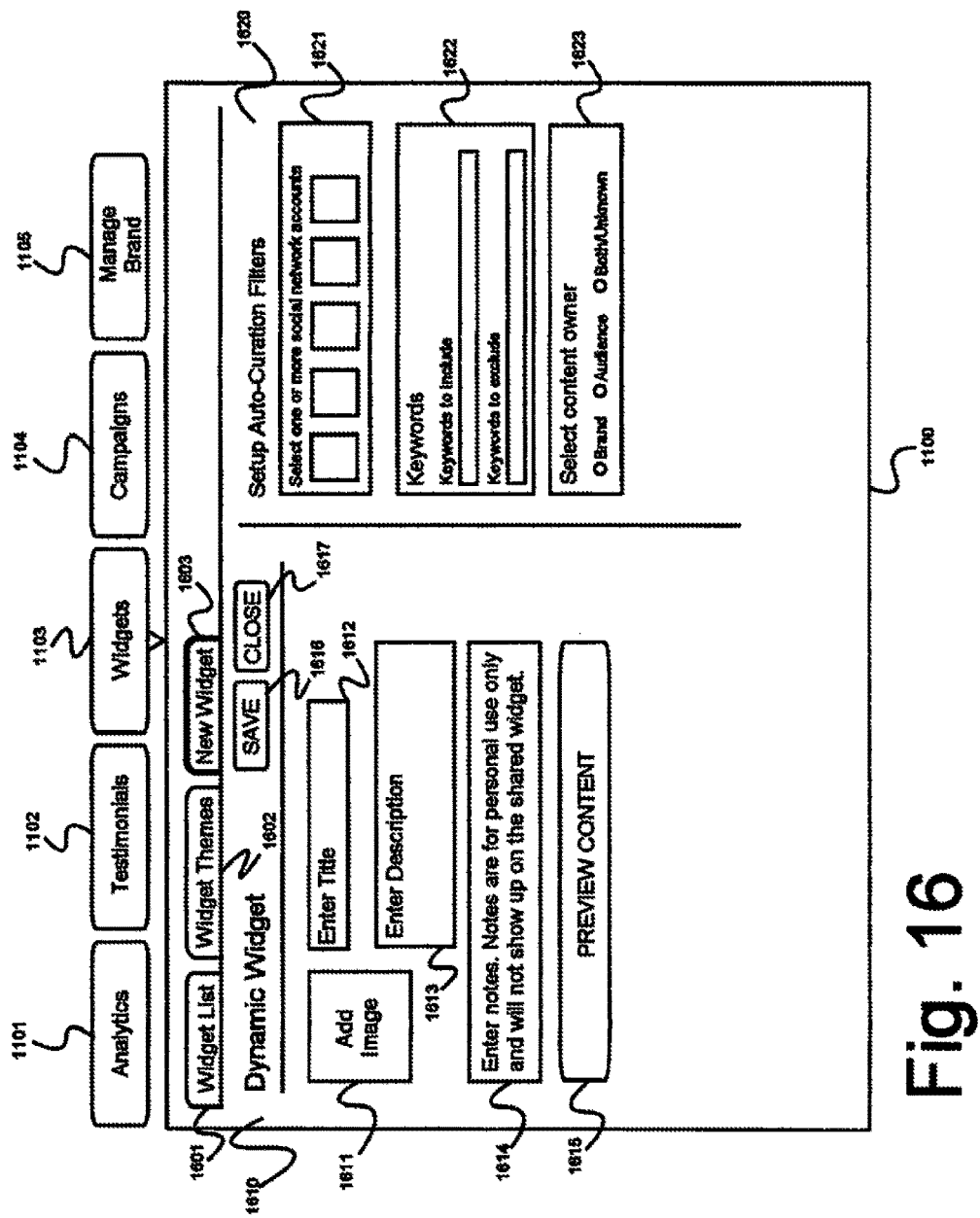
FIG. 16 is an illustration of an exemplary web-based user interface, according to an embodiment of the invention.

FIG. 16 is an illustration of an exemplary web interface 1100 for a web-based front-end application 510, particularly of a Widgets category 1103. As illustrated previously, an Analytics tab 1101 may display content comprising a company name, logo, or other identifying mark 1106, as well as further selectable tabs such as Overview 1110, Analytics 1111, Audience 1112, Content 1113, or Reports 1114. As illustrated, a Widgets category 1103 may comprise a plurality of tabs representing subcategories such as a widget list 1601, widget themes 1602, or creating a new widget 1603. Such tabs may be clickable, selectable, or otherwise user-interactive such that a user may use them to alter the displayed content of an interface 1100, for example a user might click on a widget list tab 1601 to display a list of previously created and stored widgets. As illustrated, a new widget tab 1603 may present content comprising a body section 1610 for the creation of a new dynamic widget for inclusion in web pages or content, and a separate body section 1620 for setting up a plurality of filters or rules for automatically or semi-automatically managing widgets or postings. As illustrated, a widget creation element 1610 may further comprise a clickable or otherwise user-interactive element 1611 for adding an image to a new widget, a text box or similar input element 1612 for selecting a title for a new widget, a text box or similar input element 1613 for the input of description text for a widget, a text box or similar input element 1614 where a user may input notes for personal viewing only (not to be made available to other viewers of a widget), a clickable or otherwise user-interactive button or similar element 1615 which may permit a user to preview a widget as it might appear to other viewers, a clickable or otherwise user-interactive button or similar element 1616 for saving a new widget after optionally inputting various information as described above, and a clickable or otherwise user-interactive button or similar element 1617 for closing a widget either before or after saving it (for example, if a user decides not to create a new widget at this time, it may be optionally saved for future revision and creation, or discarded with no changes made). As illustrated, a filter setup element 1620 may further comprise a plurality of organizational fields presenting a user with various metrics and options for management, such as selecting specific social media networks 1621, inputting keywords for specific inclusion or exclusion 1622, selecting content owners to which rules may be applied 1623, or other various possible options not illustrated—for example, it may be desirable to maintain a list of specific social media posters for inclusion or exclusion based on rules or even regardless of their actual posting content, and it will be appreciated that a variety of possibilities may be implemented according to the invention. It will be appreciated by one having ordinary skill in the art that such elements and their arrangement is exemplary, and arrangements and specific construction or content may vary according to the invention, and such variances may be necessary according to a variety of factors not relevant to or claimed by the Invention—such as, as previously mentioned, a specific web browser or device a user is viewing an interface 1100 with.

Figure 17:
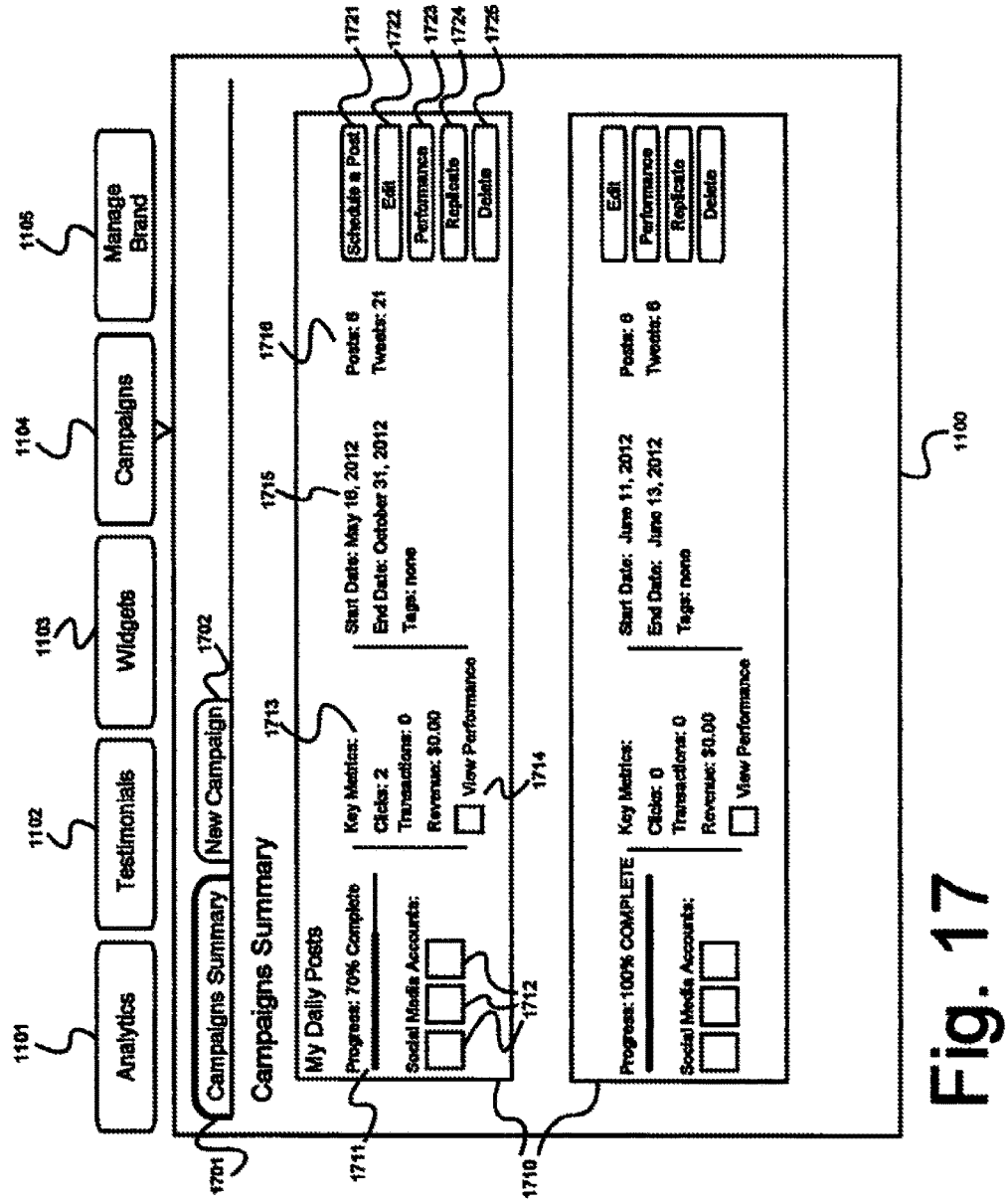
FIG. 17 is an illustration of an exemplary web-based user interface, according to an embodiment of the invention.

FIG. 17 is an illustration of an exemplary web interface 1100 for a web-based front-end application 510, particularly of a Campaigns category 1104. As illustrated previously, an Analytics tab 1101 may display content comprising a company name, logo, or other identifying mark 1106, as well as further selectable tabs such as Overview 1110, Analytics 1111, Audience 1112, Content 1113, or Reports 1114. As illustrated, a Campaigns category 1104 may present content comprising a plurality of clickable or otherwise user-interactive tabs such as for displaying a campaign summary 1701 or creating a new campaign 1702, which may permit a user to change the content being presented. As illustrated, a campaign summary tab 1701 may further comprise a plurality of body elements 1710 each corresponding to a campaign and which may further comprise a progress tracking element 1711 which may incorporate text or graphical elements to present a user with an overall metric for campaign progress, a plurality of social media icons, images, or other identifiers 1712 which may notify a user of relevant social media networks within the scope of a particular campaign, a body element tracking key metrics 1713, such as mouse clicks or transactions (as may be relevant to a campaign for an online store presence), and which may include a button or other interactive element 1714 for viewing performance as tracked by the metrics presented, a body element 1715 presenting a user with date ranges or timeframes for a campaign, a body element 1716 information regarding number of postings within or relevant to a campaign, and a plurality of clickable or otherwise user-interactive buttons or similar elements for performing actions with reference to a specific campaign. Such actions and their corresponding actions may include, but are not limited to, schedule a post in a campaign 1721, edit a campaigns details or information 1722, view performance information 1723, replicate a campaign (which may present a user with further refinements for a new replicated campaign) 1724, or delete a campaign 1725. As illustrated, not all buttons may be present for any particular campaign, and it will be appreciated by one having ordinary skill in the art that such elements and their arrangement is exemplary, and arrangements and specific construction or content may vary according to the invention, and such variances may be necessary according to a variety of factors not relevant to or claimed by the invention—such as, as previously mentioned, a specific web browser or device a user is viewing an interface 1100 with.

Description of Method Embodiments

Figure 9:
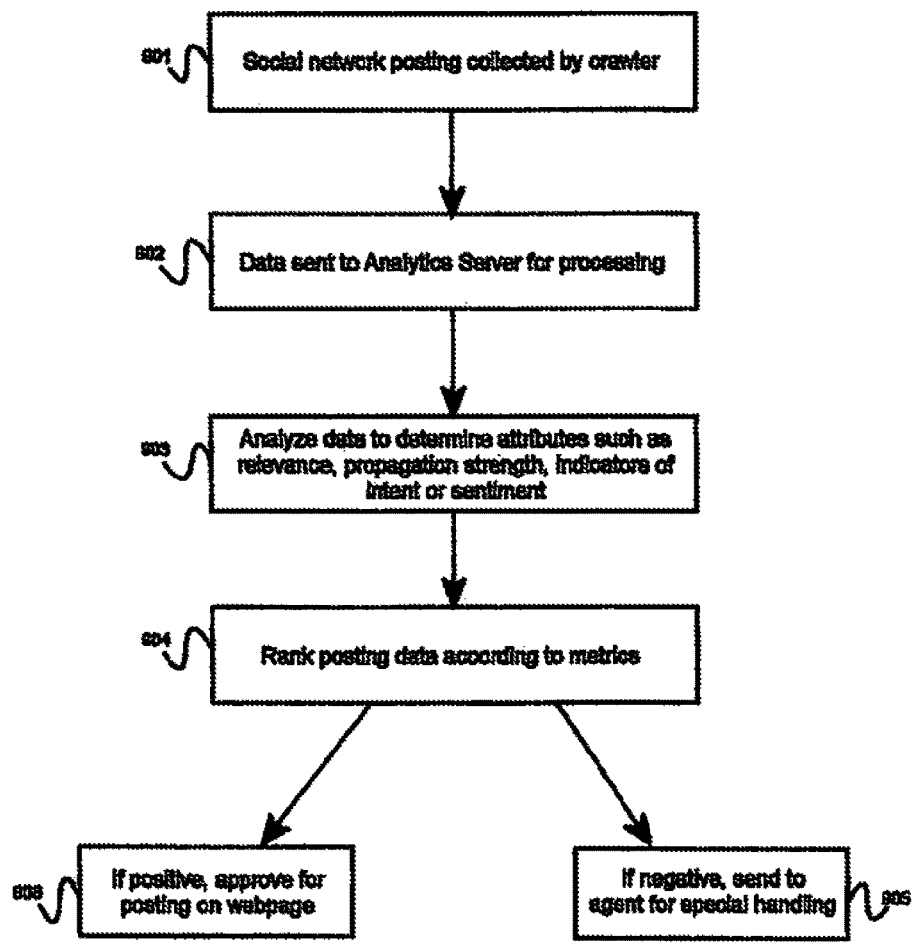
FIG. 9 is a method flow diagram illustrating network posting analysis process, according to 10 an embodiment of the invention.

FIG. 9 is a method flow diagram illustrating the general process by which social networking data is processed and handled by backend services. As illustrated, in step 901 one or more crawlers as described previously retrieves relevant data from social networking sites, such as a customer's personal information or product and service testimonials, or information pertaining to a company's competition. This data is sent to analytics server 606 in step 902 for processing. In step 903, analytics server checks the data for relevant information as described previously, comparing it against a plurality of metrics to score the data according to such qualities as relevance, likelihood and strength of propagation, and indicators of positive or negative sentiment or intent of the data's creator or poster. As before, such metrics are exemplary and it will be appreciated that there are many ways to utilize data gathered. The data is then ranked by the analytics server in step 904 according to the analysis results, and data is then selected as either positive, or negative in overall quality. In step 905, negative data is sent to a human agent for special handling without being presented to any front-end services or interfaces such as embedded widgets. In step 906, positive data is approved for display and added to a data store to be utilized in embedded widgets and other endpoints as configured by a user, as described previously.

Figure 10:
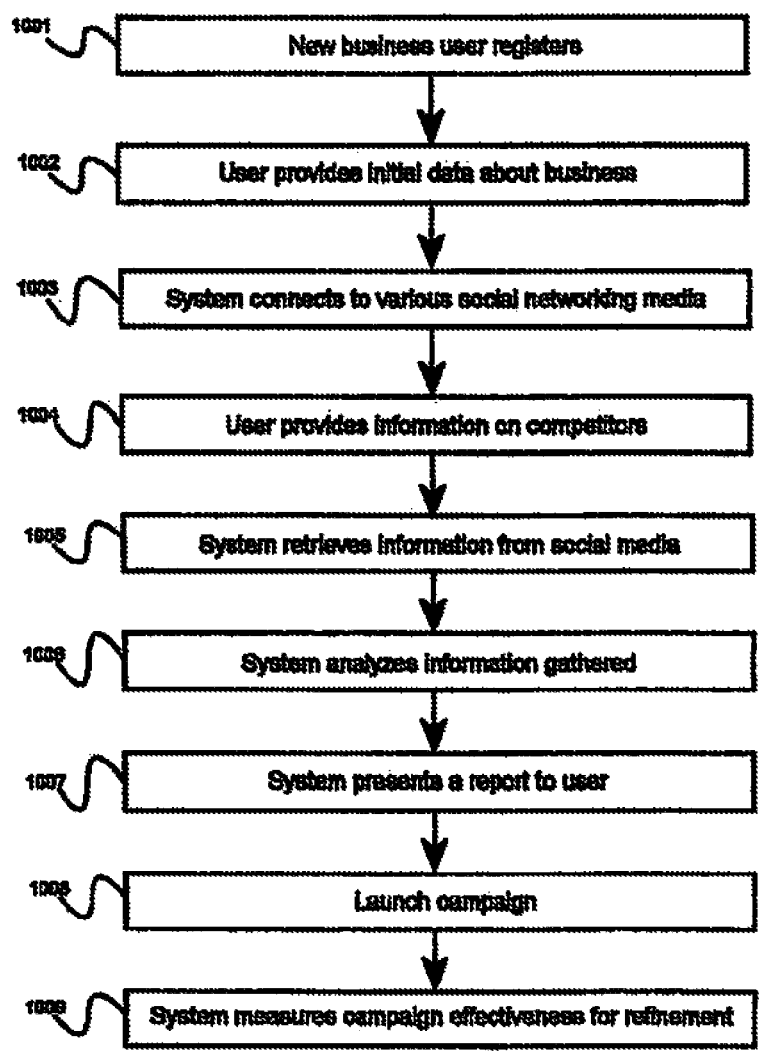
FIG. 10 is a method flow diagram illustrating a campaign process, according to an embodiment of the invention.

FIG. 10 is a method flow diagram illustrating the general process by which a new user may initiate a campaign. In step 1001, a new business user registers with the system. In step 1002 user then provides some initial data about their business, such as keywords relevant to their products or goals, names of persons within the industry, or other relevant information such as competitors' products or service reviews. System then reaches out to connect to various social networking media, such as FACEBOOK™, LINKEDIN™, TWITTER™, or any of a number of additional social media networks in step 1003. In step 1004 user then provides information on competitors, such as keywords or names as before. System 400 then collects data from various social media networks in step 1005 and analyzes gathered data in step 1006 according to various metrics as described previously. Results of analysis are presented to user in step 1007 for review, and user then has the option to launch a campaign in step 1008. Once launched, system 400 monitors results of campaign and generates reports in step 1009 for review and refinement. It will be appreciated that this analysis and reporting does not necessarily require a human user, and could be reasonably automated according to the invention and it will be further appreciated that various configurations of manual or automated refinement are possible and could be configurable via user interface applications as described previously.

According to a particular arrangement, during a campaign it may be necessary or desirable to request permissions to a user's social network content, such as a user-uploaded image, or a text posting such as a product review. Many different means of gaining permission may be utilized according to the nature of the arrangement or the particular social media content in question, for example "ad hoc" permissions, permissions on brand sites, or "back end" permissions available to content creators or web developers such as via a web interface, app, or portal.

"Ad hoc" permissions may be requested for individual content postings such as product reviews or user uploads such as images or videos, generally by utilizing in-place communication methods native to a particular social media network the content is available on. For example, if a user posts a review on TWITTER™, permission to use their posting may be requested in the form of a message or reply to their original message within the TWITTER™ communication network. In a preferred arrangement as envisioned by the inventor, a campaign manager may request permission (continuing the example using TWITTER™) using common keywords or "hashtags" as are common in social media networks, for example by sending a message to the content uploader containing a request for permission and instructions to respond using specific tags or phrases (such as "reply with #yes to agree or Arlo to decline"). If the content uploader then replies using the correct tag or phrase, the campaign manager now knows whether they have the uploader's consent to use their content, either manually or automatically such as via text recognition software during processing of the message reply or posting, as described above.

Permissions on brand sites may be presented in the form of a common checkbox or similar interactive element in a web interface or submission form, such as "check this box to agree to the terms and conditions", as is common in the art. In this manner, when a user is in the process of submitting a review or uploading content to a brand website or through a brand's software app (such as using a mobile device, for example to submit a product photo taken on the mobile device), they may be prompted to give their consent to have their content used by the brand manager as a requisite for submission. It should be appreciated that consent itself may or may not be required for submission, but it may generally be required that the user acknowledges that they have been presented with the choice and have decided whether or not to consent—thus giving a campaign manager a clear indicator of user consent without any additional action being required.

Various "back end" permissions may be obtained through web portals or software applications for users or brand managers, for example in the form of an online user profile where they may specify what type of permissions they agree to, or other configuration options such as notifications when their content is reused in a campaign or permission is requested for content that they have not yet given permission for. In this manner, individual users may easily define broad rules for content permission in a "set and forget" style of permission management, encouraging individual social media users to participate by ensuring the process is easy and convenient. Brand managers may define baseline rules for their brand, such as for a company website or online storefront, for example to define permissions regarding product images or promotions, again encouraging participation. Additionally, using such "back end" permission management, users may curate their permission settings at a later time, such as by viewing a profile or configuration interface as a part of their social media profile or web management portal, where they may be presented with a summary of permissions that have been granted or declined, or any rules they may have configured previously.

A further extension of such permissions systems, may be the disclosure of permissions within or in addition to content postings. For example, when social media content is processed for use in a campaign as described above (referring to FIG. 10), any applicable permissions may be identified and associated with the content. When the content is presented to a campaign manager for review, applicable permissions may be presented with the content so the user immediately knows what content may be available for use or what users may have given consent to have their current or future content used. This approach may enable easier campaign creation and management by removing any additional steps or operations to identify or obtain permissions from users, instead consolidating content and permissions into a single campaign preparation operation according to the methods of the invention.

The skilled person will be aware of a range of possible modifications of the various embodiments described above. Accordingly, the present invention is defined by the claims and their equivalents.

What is claimed is:

1. A system for brand management using social networks comprising:
   a server computer comprising program code stored in a memory and a message handling software module acting as a message bus, the server computer being adapted to connect to a data network;
   one or more social network crawler software modules operating on the server computer;
   an analytics server software module operating on the server computer;
   a report generator software module operating on the server computer;
   a behavioral analysis engine software module operating on the server computer; and
   a recommendation engine operating on the server computer;
   wherein a user registers with the server and provides at least one data element pertaining to a brand, and further provides one or more credentials enabling the social network crawler software modules to retrieve data relevant to the brand from one or more social networks using the credentials;
   wherein, upon retrieving content from at least one of the one or more social networks pertaining to the brand, the analytics server software module analyzes the content pertaining to the brand to determine one or more indicia of content value specific to the brand among members of the social networks;

wherein the behavioral analysis engine software module obtains one or more content elements generated by a first member of the social networks and analyzes the first member's social behavior in order to compute an indicia of an audience value of the first member; and wherein the report generator software module provides to the user one or more reports specific to the brand, the reports comprising at least the indicia of content value, the indicia of audience value, and at least one recommendation from the recommendation engine to assist the user in improving perception of or engagement with the brand by the members.

2. The system of claim 1, wherein the one or more data elements pertaining to the brand comprise one or more permissions information elements pertaining to the data elements.

3. The system of claim 2, wherein the one or more permissions information elements further comprise an agreement of consent from the user regarding the use of the data elements.

4. The system of claim 1, wherein the one or more content elements comprise permissions information elements pertaining to the content elements.

5. The system of claim 4, wherein the permissions information elements further comprise an agreement of consent from the user regarding the use of the content elements.

6. The system of claim 1, further comprising one or more third party service integration software modules operating on the server computer.

7. The system of claim 1, further comprising a search engine software module operating on the server computer.

8. The system of claim 1, further comprising a database connected to the data network.

9. A method for managing a brand using social networks, implemented at a server computer that includes at least one processor and program code stored in a memory and a message handling software module acting as a message bus, the server computer being adapted to connect to a data network, the method comprising:
    instantiating one or more of the following:
        one or more social network crawler software modules operating on the server computer;
        an analytics server software module operating on the server computer;
        a report generator software module operating on the server computer;
        a behavioral analysis engine software module operating on the server computer; and
        a recommendation engine operating on the server computer;
    registering a user with the server;
    providing at least one data element pertaining to a brand;
    providing one or more credentials enabling the social network crawler software modules to retrieve data relevant to the brand from one or more social networks using the credentials;
    upon retrieving content from at least one of the one or more social networks pertaining to the brand, analyzing, by the analytics server software module, the content pertaining to the brand to determine one or more indicia of content value specific to the brand among members of the social networks;
    obtaining, by the behavioral analysis engine software module, one or more content elements generated by a first member of the social networks;
    analyzing, by the behavioral analysis engine software module, the first member's social behavior in order to compute an indicia of an audience value of the first member; and
    generating, by the report generator software module, for the user one or more reports specific to the brand, the reports comprising at least the indicia of content value, the indicia of audience value, and at least one recommendation from the recommendation engine to assist the user in improving perception of or engagement with the brand by the members.

10. The method of claim 9, further comprising integrating one or more third party services into the server computer.

11. The method of claim 10, wherein at least one of the third party services provides a common interface that allows users to add a plurality of different third party services to the server computer.

12. The method of claim 11, wherein the plurality of different third party services comprise multiple different social networks, allowing the user to view content aggregated from the different social networks according.

13. The method of claim 9, wherein the recommendation generated by the recommendation engine is presented to the user for manual acceptance or disapproval.

14. The method of claim 13, further comprising tracking the recommendations using the analytics server software module over a specified period of time, the tracking including monitoring user actions taken relative to the brand.

15. The method of claim 13, wherein the server computer further provides scheduling functionality which allows the user to schedule reminders for completing the generated recommendations.

16. A computer-readable media having stored thereon computer-executable instructions that, when executed by one or more processors of a computing system, cause the computing system to instantiate the following:
    a server computer comprising program code stored in a memory and a message handling software module acting as a message bus, the server computer being adapted to connect to a data network;
    one or more social network crawler software modules operating on the server computer;
    an analytics server software module operating on the server computer;
    a report generator software module operating on the server computer;
    a behavioral analysis engine software module operating on the server computer; and
    a recommendation engine operating on the server computer;
    wherein a user registers with the server and provides at least one data element pertaining to a brand, and further provides one or more credentials enabling the social network crawler software modules to retrieve data relevant to the brand from one or more social networks using the credentials;
    wherein, upon retrieving content from at least one of the one or more social networks pertaining to the brand, the analytics server software module analyzes the content pertaining to the brand to determine one or more indicia of content value specific to the brand among members of the social networks;
    wherein the behavioral analysis engine software module obtains one or more content elements generated by a first member of the social networks and analyzes the first member's social behavior in order to compute an indicia of an audience value of the first member; and wherein the report generator software module provides to the user one or more reports specific to the brand, the reports comprising at least the indicia of content value, the indicia of audience value, and at least one recommendation from the recommendation engine to assist the user in improving perception of or engagement with the brand by the members.

17. The computer-readable media of claim 16, wherein the report generator software module provides an interface that allows the user to select from a plurality of different report types that are made available.

18. The computer-readable media of claim 17, wherein the report is user-configurable such that the user can tailor the available report types to their industry or brand.

19. The computer-readable media of claim 17, wherein the interface provided by the report generator software module provides a selection of previously-generated reports arranged by report type.

20. The computer-readable media of claim 16, wherein periodic reports are automatically generated and provided to the user as the server computer tracks a user's action in response to the recommendation from the recommendation engine.

\* \* \* \* \*